US011595930B2

(12) United States Patent
Kawasaki

(10) Patent No.: US 11,595,930 B2
(45) Date of Patent: Feb. 28, 2023

(54) USER EQUIPMENT (UE) AND COMMUNICATION CONTROL METHOD

(71) Applicants: SHARP KABUSHIKI KAISHA, Sakai (JP); FG Innovation Company Limited, Tuen Mun (HK)

(72) Inventor: Yudai Kawasaki, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/266,607

(22) PCT Filed: Aug. 1, 2019

(86) PCT No.: PCT/JP2019/030282
§ 371 (c)(1),
(2) Date: Feb. 7, 2021

(87) PCT Pub. No.: WO2020/031855
PCT Pub. Date: Feb. 13, 2020

(65) Prior Publication Data
US 2021/0314898 A1 Oct. 7, 2021

(30) Foreign Application Priority Data
Aug. 10, 2018 (JP) .............................. JP2018-151355

(51) Int. Cl.
*H04W 60/02* (2009.01)
*H04W 76/30* (2018.01)
*H04W 60/04* (2009.01)

(52) U.S. Cl.
CPC .......... *H04W 60/02* (2013.01); *H04W 60/04* (2013.01); *H04W 76/30* (2018.02)

(58) Field of Classification Search
CPC ..... H04W 60/02; H04W 60/04; H04W 76/30; H04W 8/082; H04W 8/065; H04W 76/34
See application file for complete search history.

(56) References Cited

U.S. PATENT DOCUMENTS

| 2021/0136719 A1* | 5/2021 | Kim ....................... H04W 60/04 |
| 2021/0136840 A1* | 5/2021 | Kawasaki ............. H04W 76/10 |

OTHER PUBLICATIONS

Huawei, HiSilicon, LADN information update and session release, 3GPP TSG CT WG1 #108 C1-180297, Jan. 26, 2018 (Year: 2018).*
3rd Generation Partnership Project. Technical Specification Group Services and System Aspects. System Architecture for the 5G System. Stage 2 (Release 15), 3GPP TS 23.501 V15.2.0 (Jun. 2018) (Year: 2018).*
Huawei, HiSilicon ; "LADN information update and session release", C1-180460; 3GPP TSG-CT WG1 Meeting #108 Gothenburg (Sweden), Jan. 22-26, 2018, the whole document.

(Continued)

*Primary Examiner* — Mazda Sabouri
(74) *Attorney, Agent, or Firm* — ScienBiziP, P.C.

(57) ABSTRACT

The present invention provides a communication means that enables use of a function for providing connectivity to a local area data network (LADN) in a 5G system (5GS). Furthermore, the present invention provides a communication means that enables use of a function for providing connectivity to an LADN between a user equipment and a network when the use of the function for providing connectivity to an LADN is enabled.

2 Claims, 5 Drawing Sheets

(56) References Cited

OTHER PUBLICATIONS

Anonymous ; "3rd generation Partnership project; Technical Specification Group Services and System Aspects; System Architecture for the 5G system; Stage 2 (release15)"; 3GPP Standard; Technication Specification; Jun. 19, 2018, paragraph [5 . 6 . 5]—paragraph [5 . 6 . 6].
Huawei, HiSilicon ; "LADN information update and session release", C1-180741; 3GPP TSG-CT WG1 Meeting #108 Gothenburg (Sweden), Jan. 22-26, 2018, the whole document.
"3rd Generation Partnership Project; Technical Specification Group Services and System Aspects; Procedures for the 5G System", 3GPP TS 23.502 V15.2.0 (Jun. 2018).
"3rd Generation Partnership Project; Technical Specification Group Core Network and Terminals; Non-Access-Stratum (NAS) protocol for 5G System (5GS)", 3GPP TS 24.501 V15.0.0 (Jun. 2018).

\* cited by examiner

USER EQUIPMENT (UE) AND COMMUNICATION CONTROL METHOD

FIELD

The present disclosure relates to a user equipment, a control apparatus and a communication control method. The present application claims priority based on Japanese Patent Application No. 2018-151355 filed in Japan on Aug. 10, 2018, the content of which is incorporated herein by reference.

BACKGROUND

In the 3rd Generation Partnership Project (3GPP), studies related to a system architecture of the next generation, i.e., a fifth generation, mobile communication system (i.e., 5G System; 5GS), have been started, and supports for new procedures and new functions are being discussed (refer to non-Patent Document 1 and non-Patent Document 2).

For example, requirements may include the followings: optimization and diversification of communication procedures adapted to various and diverse services and used for supporting continuous mobile communication services; optimization of a system architecture corresponding to the optimization and diversification of the communication procedures; and the like.

Documents of Prior Art

Non-Patent Documents

Non-Patent Document 1: 3GPP TS 23.501 v15.2.0 (2018-06); Technical Specification Group Services and System Aspects; System Architecture for the 5G System; Stage 2 (Release 15).
Non-Patent Document 2: 3GPP TS 23.502 v15.2.0 (2018-06); Technical Specification Group Services and System Aspects; Procedures for the 5G System; Stage 2 (Release 15).
Non-Patent Document 3: 3GPP TS 24.501 v15.0.0 (2018-06); Technical Specification Group Core Network and Terminals; Non-Access-Stratum (NAS) protocol for 5G System (5GS); Stage 3 (Release 15).

SUMMARY

Technical Problem to be Solved by the Present Invention

In a 5G system (5GS), a 5G core network (5GCN) is being studied as a new core network in order to provide various and diverse services. In addition, new functions such as a function for providing connectivity to a local area data network (LADN) are supported in the 5GS.

In the 5GS, studies on further expansion of new functions such as a function for providing connectivity to an LADN have also begun. However, when the function for providing connectivity to the LADN is implemented, how to use new procedures or new functions to implement it in 5GS is not clear.

One aspect of the present invention has been made in view of the above circumstance, and the objective of the present invention is to provide a method for implementing a function for providing connectivity to an LADN in a 5GS.

Solution to the Problem

A user equipment (UE) according to an embodiment of the present invention comprises a storage unit configured to store local area data network (LADN) information; a transceiving unit configured to receive a registration accept message from an access and mobility management function (AMF) in a registration procedure for mobility and registration update; and a control unit, wherein when the AMF does not include the LADN information in the registration accept message in the registration procedure, the control unit is configured to delete the LADN information stored by the storage unit, recognize that the UE is located outside an LADN service area, and cause the UE to transition to a state so as to initiate a UE-requested protocol data unit (PDU) session release procedure for releasing a PDU session for the LADN.

A communication control method for a user equipment (UE) according to an embodiment of the present invention comprises the following steps: storing local area data network (LADN) information; and receiving a registration accept message from an access and mobility management function (AMF) in a registration procedure for mobility and registration update, wherein when the AMF does not include the LADN information in the registration accept message in the registration procedure, the method further comprises: deleting the stored LADN information, recognizing that the UE is located outside an LADN service area, and causing the UE to transition to a state so as to initiate a UE-requested protocol data unit (PDU) session release procedure for releasing a PDU session for the LADN.

Invention Effect

One aspect according to the present invention can implement a function for providing connectivity to an LADN in a 5GS, so that a function for providing connectivity to an LADN can be used.

DETAILED DESCRIPTION OF THE PREFERRED EMBODIMENTS

Preferred embodiments of the present invention will be described with reference to the accompanying drawings.

1. System Overview

Figure 1:
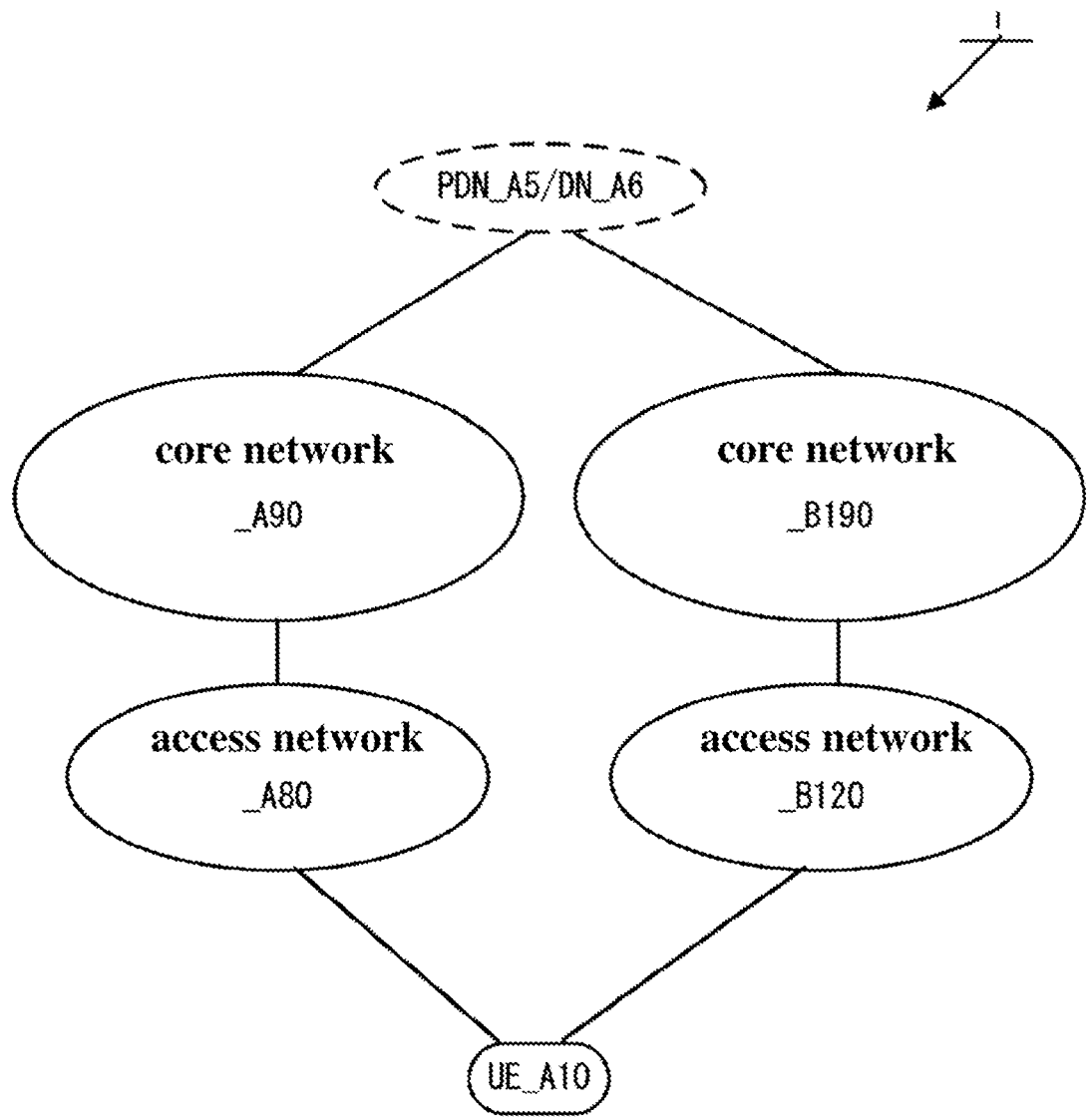
FIG. 1 is a schematic diagram for illustrating a mobile communication system (EPS/5GS).
Figure 2:
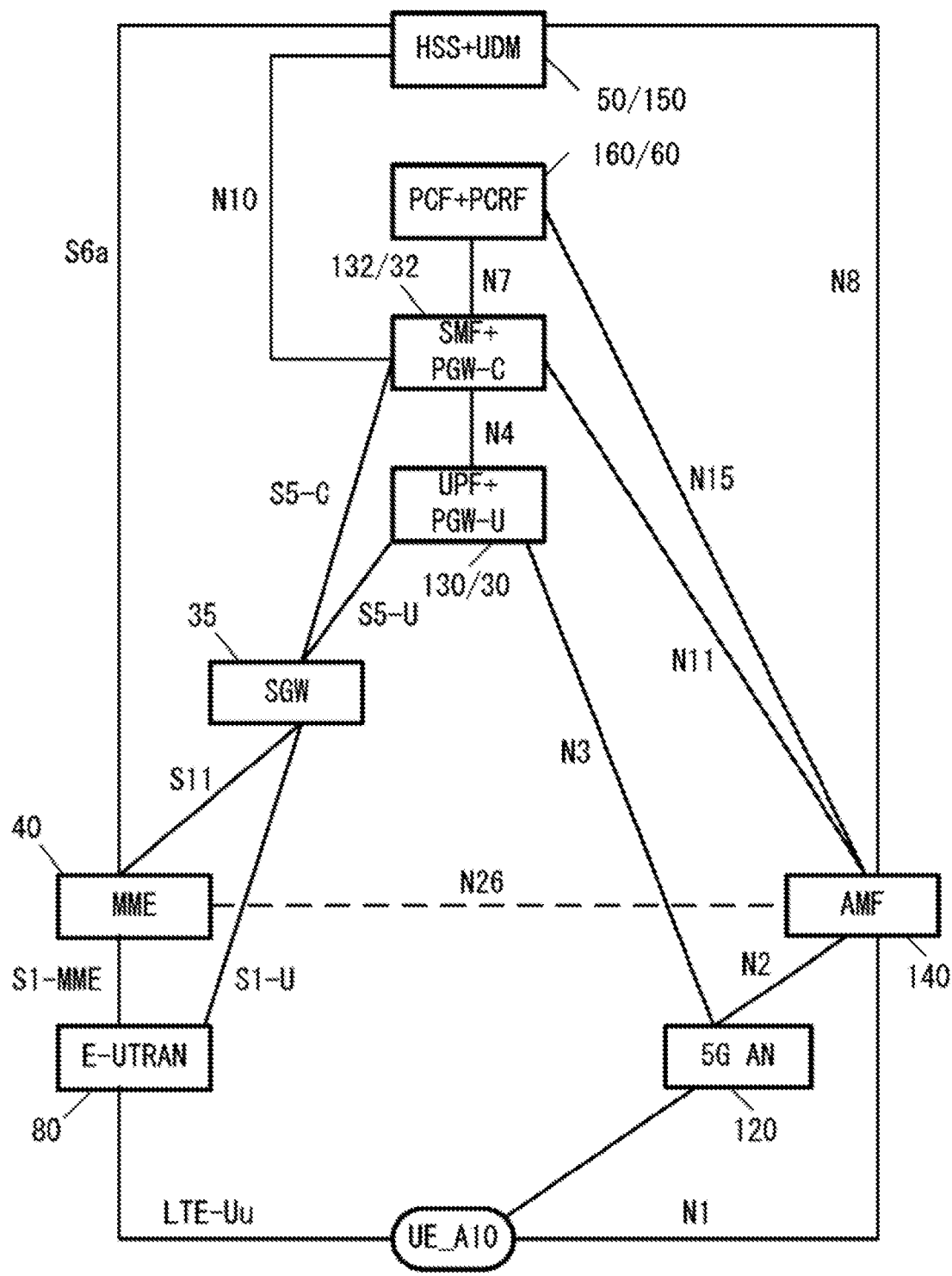
FIG. 2 is a schematic diagram for illustrating a detailed architecture of a mobile communication system (EPS/5GS).

First, FIG. 1 is a schematic diagram for illustrating a mobile communication system 1 used in each embodiment, and FIG. 2 is a schematic diagram for illustrating a detailed architecture of the mobile communication system 1.

FIG. 1 shows a mobile communication system 1 that includes a UE_A10, an access network_A80, a core network_A90, a packet data network PDN_A5, an access network_B120, a core network_B190, and a data network DN_A6.

Hereinafter, these apparatuses and functions may be described with reference numerals omitted, such as a UE, an access network_A, a core network_A, a PDN, an access network_B, a core network_B, and a DN.

In addition, FIG. 2 shows apparatuses and functions such as a UE_A10, E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, and a UDM 150, and interfaces connecting these apparatuses and functions.

Hereinafter, these apparatuses and functions may be described with reference numerals omitted, such as a UE, a E-UTRAN, an MME, an SGW, a PGW-U, a PGW-C, a PCRF, an HSS, a 5G AN, an AMF, a UPF, an SMF, a PCF, and a UDM.

Besides, a system serving as an evolved packet system (EPS) of a 4G system may include an access network_A and a core network_A, and may further include a UE and/or a PDN. In addition, a system serving as a 5G system (5GS) may include a UE, an access network_B and a core network_B, and may further include a DN.

A UE is an apparatus capable of connecting to a network service via a 3GPP access (also referred to as a 3GPP access network or a 3GPP AN) and/or a non-3GPP access (also referred to as a non-3GPP access network or a non-3GPP AN). The UE may be a terminal apparatus, such as a mobile phone or a smartphone, capable of performing a wireless communication, or may be a terminal apparatus capable of connecting to an EPS and may also be capable of connecting to a 5GS. The UE may also be provided with an universal integrated circuit card (UICC) or an embedded UICC (eUICC). In addition, the UE may be expressed as a user equipment, or may also be expressed as a terminal apparatus.

In addition, the access network_A corresponds to an evolved universal terrestrial radio access network (E-UTRAN) and/or a wireless local area network (LAN) access network. The E-UTRAN is provided with one or more evolved Node Bs (eNBs) 45. Besides, the eNB 45 may be described with the reference numeral omitted, such as eNB. In addition, when there are a plurality of eNBs, the eNBs are connected to each other through, for example, an X2 interface. Further, the wireless LAN access network is provided with one or more access points.

In addition, the access network_B corresponds to a 5G access network (5G AN). The 5G AN includes a next generation radio access network (NG-RAN) and/or a non-3GPP access network. The NG-RAN is provided with one or more gNBs (NR Node Bs) 122. Besides, the gNB 122 may be described with the reference numeral omitted, such as gNB. The gNB is a node that provides a UE with a new radio (NR) user plane and control plane, and is a node connected to a 5GCN via an NG interface (including an N2 interface or an N3 interface). That is, the gNB is a base station apparatus newly designed for the 5GS, and provides a function different from that of a base station apparatus (eNB) used for the EPS of the 4G system. In addition, when there are a plurality of gNBs, the gNBs are connected to each other through, for example, an Xn interface.

Further, hereinafter, an E-UTRAN or an NG-RAN is sometimes referred to as a 3GPP access. Furthermore, a wireless LAN access network or a non-3GPPP AN is sometime referred to as a non-3GPPP access. In addition, a node provided in the access network_B may be collectively referred to as an NG-RAN node.

Besides, hereinafter, the access network_A and/or the access network_B, and/or an apparatus included in the access network_A and/or an apparatus included in the access network_B may be sometimes referred to as an access network or an access network apparatus.

In addition, the core network_A corresponds to an evolved packet core (EPC). The EPC is provided with, for example, a mobility management entity (MME), a serving gateway (SGW), a packet data network gateway-U (PGW-U), a PGW-C, a policy and charging rules function (PCRF), a home subscriber server (HSS), etc.

Besides, the core network_B corresponds to a 5G core network (5GCN). The 5GCN is provided with, for example, an access and mobility management function (AMF), a user plane function (UPF), a session management function (SMF), a policy control function (PCF), a unified data management (UDM), etc. Here, the 5GCN may also be expressed as a 5GC.

Besides, hereinafter, the core network_A and/or the core network_B, an apparatus included in the core network_A and/or an apparatus included in the core network_B may be sometimes referred to as a core network or a core network apparatus.

The core network (e.g., core network_A and/or core network_B) may be an IP (Internet Protocol) mobile communication network used by a mobile network operator (MNO) for connecting the access network (e.g., access network_A and/or access network_B) to the PDN and/or DN, or may be a core network used by a mobile network operator that operates and manages the mobile communication system 1, or may be a core network used by a mobile virtual operator or a mobile virtual service provider, such as a mobile virtual network operator (MVNO) or a mobile virtual network enabler (MVNE).

In addition, although the PDN and the DN shown in FIG. 1 may be the same, they may also be different. The PDN may also be a data network (DN) that provides the UE with a communication service. Moreover, the DN may be configured as a packet data service network, or may be configured separately for each service. Furthermore, the PDN may also include a communication terminal connected thereto. Therefore, a connection with the PDN may also be a connection with a communication terminal or a server apparatus deployed in the PDN. Further, a transmission/reception of user data to/from the PDN may also be a transmission/reception of user data to/from a communication terminal or a server apparatus deployed in the PDN. Besides, the PDN may also be expressed as the DN, or the DN may also be expressed as the PDN.

In addition, hereinafter, at least one part of the access network_A, the core network_A, the PDN, the access network_B, the core network_B, and the DN, and/or one or more apparatuses included therein may be sometimes referred to as a network or a network apparatus. That is, an information transmission/reception and/or a procedure execution performed by a network and/or a network apparatus may mean an information transmission/reception and/or a procedure execution performed by at least one part of the access network_A, the core network_A, the PDN, the access network_B, the core network_B, and the DN and/or one or more apparatuses included therein.

In addition, the UE can connect to an access network. Besides, the UE can connect to a core network via an access network. Further, the UE can connect to the PDN or the DN via the access network and the core network. That is, the UE can transmit and/or receive user data (communication) to and/or from the PDN or the DN. When user data is transmitted and/or received, not only an Internet protocol (IP) communication but also a non-IP communication may be used.

Here, the IP communication means a data communication that uses IP, and data is transmitted and/or received in IP packets. An IP packet consists of an IP header and a payload portion. The payload portion includes data transmitted and/or received by apparatuses and functions included in the EPS or by apparatuses and functions included in the 5GS. In addition, the so-called non-IP communication means a data communication that does not use IP, and data is transmitted and/or received through a form different from the configuration of an IP packet. For example, the non-IP communication may be a data communication implemented by transmitting and/or receiving application data that is not added with an IP header, or user data that is transmitted and/or received by the UE and added with other header such as a MAC header or an Ethernet (registered trademark) frame header.

2. Configuration of Each Apparatus

Next, the configuration of each apparatus (UE, and/or access network apparatus, and/or core network apparatus) used in each embodiment will be described with reference to drawings. Further, each apparatus may be configured as physical hardware, logical (virtual) hardware implemented on general-purpose hardware, or software. In addition, at least one part (including all parts) of functions included by each apparatus may be configured as physical hardware, logical hardware, or software.

Besides, each storage unit (storage unit_A340, storage unit_A440, storage unit_B540, storage unit_A640, or storage unit_B740) in each of the apparatuses and functions described below may be, for example, a semiconductor memory, a solid state drive (SSD), a hard disk drive (HDD), or the like. Besides, each storage unit can store not only information originally set from the shipment stage, but also various kinds of information transmitted and/or received between apparatuses/functions themselves and other apparatuses/functions (for example, UEs, and/or access network apparatuses, and/or core network apparatuses, and/or PDNs, and/or DNs). Further, each storage unit can store identification information, control information, flags, parameters, etc. included in control messages transmitted and/or received in various communication procedures described later. Furthermore, each storage unit may also store these information for each UE. In addition, when interworking between the 5GS and the EPS is performed, each storage unit can store control messages or user data transmitted and/or received between apparatuses or functions included in the 5GS and/or the EPS. Here, each storage unit can store not only control messages or user data that are transmitted and/or received through the N26 interface, but also control messages or user data that are not transmitted and/or received through the N26 interface.

[2.1. Apparatus Configuration of UE]

Figure 3:
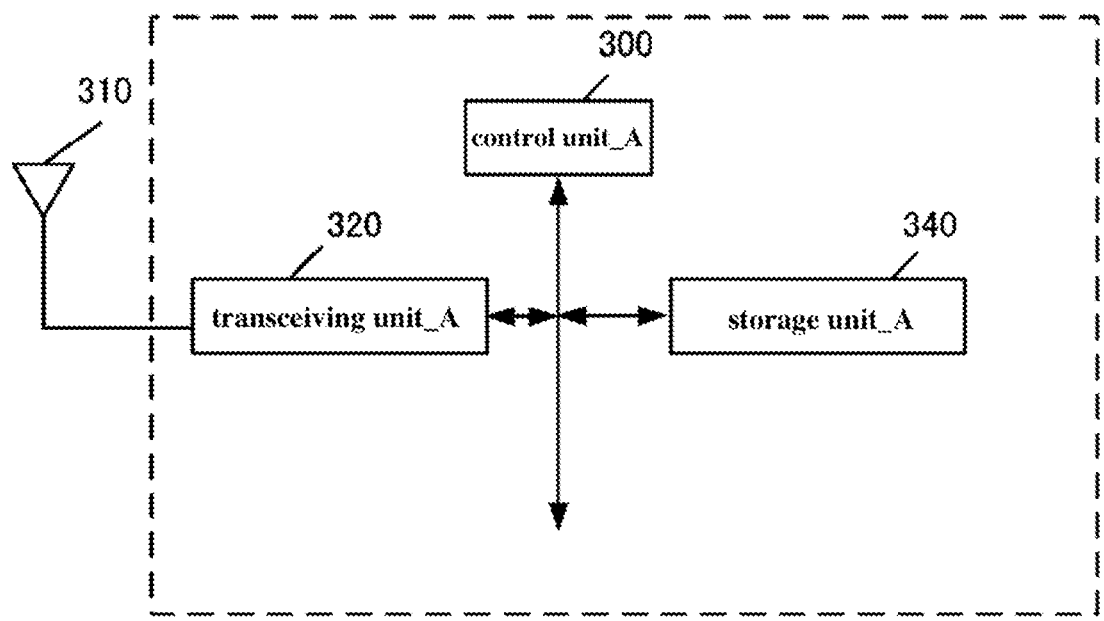
FIG. 3 is a schematic diagram for illustrating an architecture of a UE.

First, an exemplary configuration of a user equipment (UE) will be described with reference to FIG. 3. The UE includes a control unit_A 300, an antenna 310, a transceiving unit_A 320, and a storage unit_A 340. The control unit_A 300, the transceiving unit_A 320, and the storage unit_A 340 are connected via a bus. The transceiving unit_A 320 is connected to the antenna 310.

The control unit_A 300 is a function unit that controls operations and functions of the entire UE. The control unit_A 300 reads and executes various programs stored in the storage unit_A 340 as necessary, thereby implementing various processes in the UE.

The transceiving unit_A 320 is a functional unit for performing a wireless communication, via an antenna, with a base station apparatus (eNB or gNB) located within the access network. That is, the UE can transmit and/or receive user data and/or control information to and/or from the access network apparatus and/or the core network apparatus and/or the PDN and/or the DN by using the transceiving unit A320.

As illustrated in detail with reference to FIG. 2, the UE can communicate, via the LTE-Uu interface, with the base station apparatus (eNB) located within the E-UTRAN by using the transceiving unit_A 320. In addition, the UE can communicate with the base station apparatus (gNB) located within the 5G AN by using the transceiving unit_A 320. Besides, the UE can transmit and/or receive AMF and NAS (Non-Access-Stratum) messages via the N1 interface by using the transceiving unit_A 320. However, the N1 interface is logical, so the communication between the UE and the AMF is actually performed via the 5G AN.

The storage unit_A 340 is a functional unit for storing programs, user data, control information, and the like required for each operation of the UE.

[2.2. Apparatus Configuration of gNB]

Figure 4:
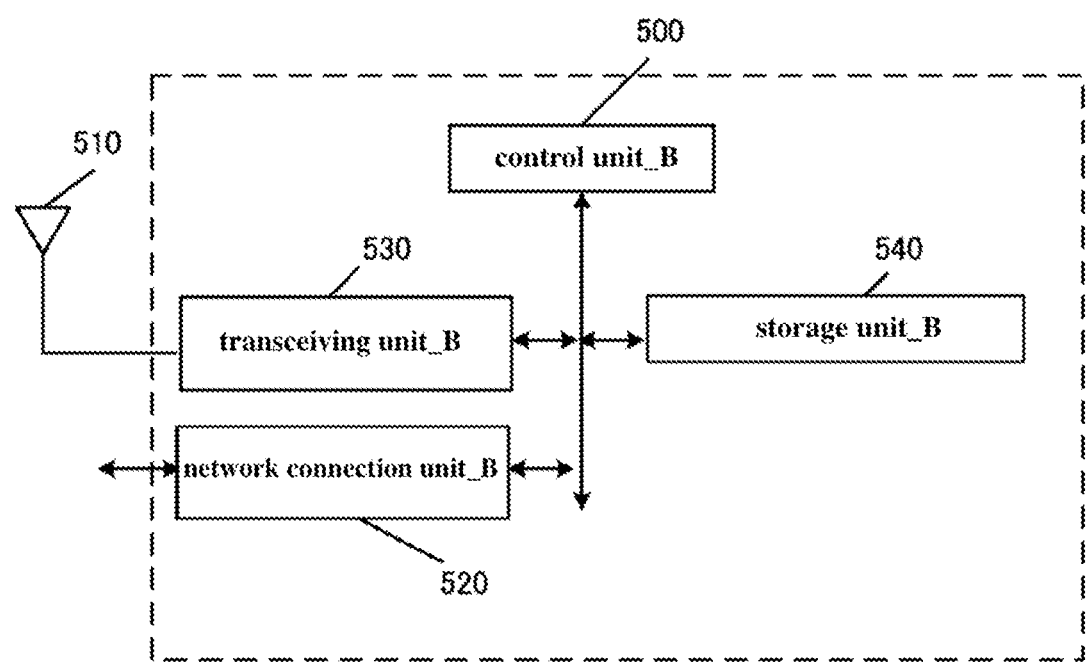
FIG. 4 is a schematic diagram for illustrating a configuration of a network access apparatus (gNB) in a 5GS.

Next, an example of the apparatus configuration of a gNB will be described with reference to FIG. 4. The gNB includes a control unit_B 500, an antenna 510, a network connection unit_B 520, a transceiving unit_B 530, and a storage unit_B 540. The control unit_B 500, the network connection unit_B 520, the transceiving unit_B 530, and the storage unit_B 540 are connected via a bus. The transceiving unit_B 530 is connected to the antenna 510.

The control unit_B 500 is a function unit that controls operations and functions of the entire gNB. The control unit_B 500 reads and executes various programs stored in the storage unit_B 540 as necessary, thereby implementing various processes in the gNB.

The network connection unit_B 520 is a functional unit used for the gNB to communicate with the AMF and/or the UPF. That is, the gNB can transmit and/or receive user data and/or control information to and/or from the AMF and/or the UPF by using the network connection unit_B 520.

The transceiving unit_B 530 is a functional unit for performing a wireless communication, via an antenna 510, with the UE. That is, the gNB can transmit and/or receive user data and/or control information to and/or from the UE by using the transceiving unit_B 530.

As illustrated in detail with reference to FIG. 2, by the use of the network connection unit_B 520, the gNB located within the 5G AN can communicate with the AMF via the N2 interface and can communicate with the UPF via the N3 interface. In addition, the gNB can communicate with the UE by using the transceiving unit_B 530.

The storage unit_B 540 is a functional unit for storing programs, user data, control information, and the like required for each operation of the eNB.

[2.3. Apparatus Configuration of AMF]

Figure 5:
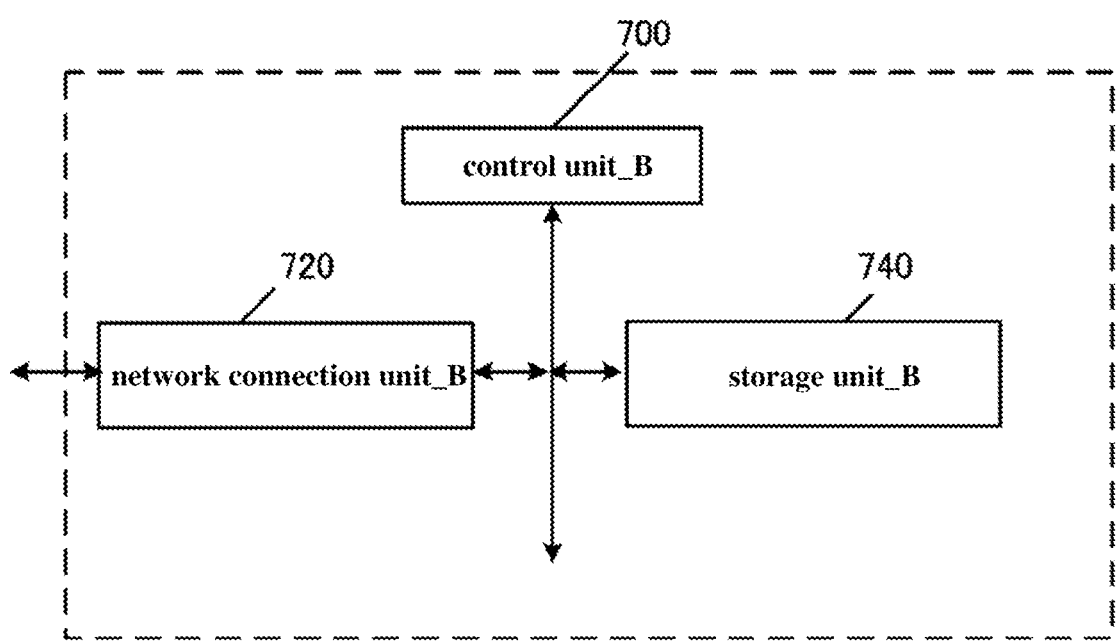
FIG. 5 is a schematic diagram for illustrating a configuration of a core network apparatus (AMF/SMF/UPF) in a 5GS.

Next, an example of the apparatus configuration of an AMF will be described with reference to FIG. 5. The AMF includes a control unit_B 700, a network connection unit_B 720, and a storage unit_B 740. The control unit_B 700, the network connection unit_B 720, and the storage unit_B 740 are connected via a bus. The AMF can also be a node for operating a control plane.

The control unit_B 700 is a function unit that controls operations and functions of the entire AMF. The control unit_B 700 reads and executes various programs stored in the storage unit_B 740 as necessary, thereby implementing various processes in the AMF.

The network connection unit_B 720 is a functional unit used for the AMF to connect with the base station apparatus (gNB) located within the 5G AN, and/or the SMF, and/or the PCF, and/or the UDM, and/or an SCEF. That is, the AMF can transmit and/or receive user data and/or control information to and/or from the base station apparatus (gNB) located within the 5G AN, and/or the SMF, and/or the PCF, and/or the UDM, and/or the SCEF by using the network connection unit_B 720.

As illustrated in detail with reference to FIG. 2, the AMF located within the 5GCN, by using the network connection unit_B 720, can communicate with the gNB via the N2 interface, communicate with the UDM via the N8 interface, communicate with SMF via the N11 interface, and communicate with the PCF via the N15 interface. In addition, the AMF can transmit and/or receive NAS messages to and/or from the UE via the N1 interface by using the network connection unit_B 720. However, the N1 interface is logical, so the communication between the UE and the AMF is actually performed via the 5G AN. In addition, when the AMF supports the N26 interface, it can communicate with the MME via the N26 interface by using the network connection unit_B 720.

The storage unit_B 740 is a functional unit for storing programs, user data, control information, and the like required for each operation of the AMF.

Besides, the AMF includes the following functions: a function for exchanging a control message with the RAN by using the N2 interface, a function for exchanging a NAS message with a UE by using the N1 interface, a function for performing encryption and integrity protection for a NAS message, a registration management (RM) function, a connection management (CM) function, a reachability management function, a mobility management function for UEs, a function for transmitting a session management (SM) message between a UE and the SMF, an access authentication function, security anchor functionality (SEA), a security context management (SCM) function, a function for supporting the N2 interface for a non-3GPP interworking function (N3IWF), a function for supporting transmission and reception of NAS signals with a UE via the N3IWF, a function for authenticating a UE connected via the N3IWF, and the like.

In addition, in the registration management, a RM state of each UE is managed. The RM state may also be synchronized between the UE and the AMF. The RM state includes a deregistered state (RM-DEREGISTERED state) and a registered state (RM-REGISTERED state). In the RM-DEREGISTERED state, the UE is not registered in the network, so that the UE context in the AMF does not have valid location information or routing information for the UE, so the AMF is unable to reach the UE. In the RM-REGISTERED state, the UE is registered with the network, so that the UE can receive services that require registration with the network. Besides, the RM state may also be expressed as a 5GMM state. Here, the RM-DEREGISTERED state may be expressed as a 5GMM-DEREGISTERED state, and the RM-REGISTERED state may be expressed as a 5GMM-REGISTERED state.

In other words, the 5GMM-REGISTERED state may be a state in which each apparatus has established a 5GMM context, or may also be a state in which a PDU session context has been established. Further, when each apparatus is 5GMM-REGISTERED, the UE_A 10 may start transmitting and/or receiving user data or control messages, or may also respond to paging. Furthermore, when each apparatus is 5GMM-REGISTERED, the UE_A 10 may perform a registration procedure other than the registration procedure for initial registration and/or a service request procedure.

In addition, the 5GMM-DEREGISTERED state may be a state in which each apparatus has not established a 5GMM context, or may also be a state in which the location information of the UE_A 10 is not known to the network, or may also be a state in which the network is unable to reach the UE_A 10. Further, when each apparatus is 5GMM-DEREGISTERED, the UE_A10 may also initiate a registration procedure, or may also establish a 5GMM context by performing a registration procedure.

In addition, in the connection management, a CM state of each UE is managed. The CM state may also be synchronized between the UE and the AMF. The CM state includes a non-connected state (CM-IDLE state) and a connected state (CM-CONNECTED state). In the CM-IDLE state, the UE stays in the RM-REGISTERED state, but does not have a NAS signaling connection established with the AMF via the N1 interface. In addition, in the CM-IDLE state, the UE does not have an N2 interface connection (N2 connection) or an N3 interface connection (N3 connection). On the other hand, in the CM-CONNECTED state, the UE has an NAS signaling connection established with the AMF via the N1 interface. Besides, In the CM-CONNECTED state, the UE may have an N2 interface connection (N2 connection) and/or an N3 interface connection (N3 connection).

Furthermore, in the connection management, a CM state in 3GPP access and a CM state in non-3GPP access may be managed separately. Here, the CM state in 3GPP access may include a non-connected state in 3GPP access (CM-IDLE state over 3GPP access) and a connected state in 3GPP access (CM-CONNECTED state over 3GPP access). Further, the CM state in non-3GPP access may include a non-connected state in non-3GPP access (CM-IDLE state over non-3GPP access) and a connected state in non-3GPP access (CM-CONNECTED state over non-3GPP access). In addition, the non-connected state may also be expressed as an idle mode, and the connected state may also be expressed as a connected mode.

In addition, the CM state may also be expressed as a 5GMM mode. Here, the non-connected state may also be expressed as a 5GMM non-connected mode (5GMM-IDLE mode), and the connected state may also be expressed as a 5GMM connected mode (5GMM-CONNECTED mode). Furthermore, the non-connected state in 3GPP access may be expressed as a 5GMM non-connected mode in 3GPP access (5GMM-IDLE mode over 3GPP access), and the connected state in 3GPP access may be expressed as a 5GMM-connected mode in 3GPP access (5GMM-CONNECTED mode over 3GPP access). Furthermore, the non-connected state in non-3GPP access may be expressed as a 5GMM non-connected mode in non-3GPP access (5GMM-IDLE mode over non-3GPP access), and the connected state in non-3GPP access may be expressed as a 5GMM-connected mode in non-3GPP access (5GMM-CONNECTED mode over non-3GPP access). Besides, the 5GMM non-connected mode may also be expressed as an idle mode, and the 5GMM connected mode may also be expressed as a connected mode.

In addition, there may be one or more AMFs deployed within the core network_B. Further, the AMF may be an NF that manages one or more network slice instances (NSIs). Furthermore, the AMF may also be a common control plane network function (Common CPNF; CCNF) shared among a plurality of NSIs.

Besides, the N3IWF is an apparatus and/or a function deployed between the non-3GPP access and the 5GCN when the UE is connected to the 5GS via the non-3GPP access.

[2.4. Apparatus Configuration of SMF]

Next, an example of the apparatus configuration of an SMF will be described with reference to FIG. 5. The SMF includes a control unit_B 700, a network connection unit_B 720, and a storage unit_B 740. The control unit_B 700, the network connection unit_B 720, and the storage unit_B 740 are connected via a bus. The SMF can also be a node for operating a control plane.

The control unit_B 700 is a function unit that controls operations and functions of the entire SMF. The control unit_B 700 reads and executes various programs stored in the storage unit_B 740 as necessary, thereby implementing various processes in the SMF.

The network connection unit_B 720 is a functional unit used for the SMF to connect with AMF, and/or the UPF, and/or the PCF, and/or the UDM. That is, the SMF can transmit and/or receive user data and/or control information to and/or from the AMF, and/or the UPF, and/or PCF, and/or UDM by using the network connection unit_B 720.

As illustrated in detail with reference to FIG. 2, by the use of the network connection unit_B 720, the SMF located within the 5GCN can communicate with the AMF via the N11 interface, communicate with the UPF via the N4 interface, communicate with PCF via the N7 interface, and communicate with the UDM via the N10 interface.

The storage unit_B 740 is a functional unit for storing programs, user data, control information, and the like required for each operation of the SMF.

The SMF includes the following functions: a session management function such as establishment, modification, cancellation of a PDU session, IP address allocation for the UE and a management function thereof, a UPF selection and control function, a UPF configuration function for routing traffic to an appropriate destination (transmission destination), a function for transmitting and/or receiving an SM portion of an NAS message, a function for reporting arrival of downlink data (Downlink Data Notification), a function for providing SM information unique to an AN (for each AN) to be transmitted to the AN over the N2 interface via the AMF, a function for determining a session and service continuity mode (SSC mode) for a session, a roaming function, and the like.

[2.5. Apparatus Configuration of UPF]

Next, an example of the apparatus configuration of an UPF will be described with reference to FIG. 5. The UPF includes a control unit_B 700, a network connection unit_B 720, and a storage unit_B 740. The control unit_B 700, the network connection unit_B 720, and the storage unit_B 740 are connected via a bus. The UPF can also be a node for operating a control plane.

The control unit_B 700 is a function unit that controls operations and functions of the entire UPF. The control unit_B 700 reads and executes various programs stored in the storage unit_B 740 as necessary, thereby implementing various processes in the UPF.

The network connection unit_B 720 is a functional unit used for the UPF to connect with the base station apparatus (gNB) located within the 5G AN, and/or the SMF, and/or the DN. That is, the UPF can transmit and/or receive user data and/or control information to/from the base station apparatus (gNB) located within the 5G AN, and/or the SMF, and/or the DN by using the network connection unit_B 720.

As illustrated in detail with reference to FIG. 2, by the use of the network connection unit_B 720, the UPF located within the 5GCN can communicate with the gNB via the N3 interface, communicate with the SMF via the N4 interface, communicate with DN via the N6 interface, and communicate with other UPF via the N9 interface.

The storage unit_B 740 is a functional unit for storing programs, user data, control information, and the like required for each operation of the UPF.

The UPF includes the following functions: a function for serving as an anchor point for intra-RAT mobility or for inter-RAT mobility, a function for serving as an external PDU session point for a mutual connection to the DN (i.e., a function for serving as a gateway to transmit user data between the DN and the core network_B), a packet routing & forwarding function, an uplink classifier (UL CL) function for supporting routing of a plurality of traffic flows for one DN, a branching point function for supporting a multi-homed PDU session, a quality of service (QoS) processing function for a user plane, a function for verifying an uplink traffic, a function for buffering downlink packets, a function for triggering a downlink data notification, and the like.

In addition, the UPF may serve as a gateway for IP communication and/or non-IP communication. Further, the UPF may also include a function for forwarding IP communication, or may also include a function for performing conversion between non-IP communication and IP communication. Furthermore, a plurality of gateways may be configured to connect the core network_B to a single DN. Besides, the UPF may have connectivity with other NFs, or may be connected to each apparatus via other NFs.

Moreover, the user plane may be user data that is transmitted and/or received between the UE and the network. The user plane may also be transmitted and/or received by using a PDN connection or a PDU session. Further, in the case of the EPS, the user plane may be transmitted and/or received by using the LTE-Uu interface, and/or the S1-U interface, and/or the S5 interface, and/or the S8 interface and/or the SGi interface. Furthermore, in the case of the 5GS, the user plane may be transmitted and/or received by using the interface between the UE and the NGRAN, and/or the N3 interface, and/or the N9 interface, and/or the N6 interface. Hereinafter, the user plane may also be expressed as a U-Plane.

Moreover, the control plane is a control message that is transmitted and/or received in order to perform communication control of the UE, and the like. The control plane may also be transmitted and/or received by using a non-access-stratum (NAS) signaling connection between the UE and the MME. Furthermore, in the case of the EPS, the control plane may also be transmitted and/or received by using the LTE-Uu interface and the S1-MME interface. Furthermore, in the case of the 5GS, the control plane may be transmitted and/or received by using the interface between the UE and the NGRAN, and the N2 interface. Hereinafter, the control plane may also be expressed as a control plane or may also be expressed as a C-Plane.

Furthermore, the U-Plane (User Plane or UP) may also be a communication path for transmitting and/or receiving user data, and may include a plurality of bearers. Further, the C-Plane (Control Plane or CP) may also be a communication path for transmitting and/or receiving a control messages, and may include a plurality of bearers.

[2.6. Description of Other Apparatuses and/or Functions]

Next, other apparatuses and/or functions are described below.

The PCF includes a function for providing a policy rule and the like.

In addition, the UDM includes an authentication credential processing function, a user identification processing function, an access authentication function, a registration/mobility management function, a subscription management function, and the like.

Besides, the PCRF is connected to the PGW and/or the PDN, and includes a function for performing QoS management for data delivery. For example, the PCRF may perform QoS management for a communication path between the UE_A10 and the PDN. Furthermore, the PCRF may be an apparatus that creates and/or manages a policy and charging control (PCC) rule and/or a routing rule used by each apparatus for transmitting and/or receiving user data.

In addition, the HSS is connected to the MME and/or the SCEF, and includes a function for performing subscription management, and the like. The subscriber information of the HSS is referred to, for example, at the time of access control of the MME. Further, the HSS may be connected to a location management apparatus different from the MME.

In addition, the SCEF is connected to the DN and/or the PDN, the MME, and the HSS, and includes a function for serving as a relay apparatus that functions as a gateway to connect the DN and/or the PDN to the core network_A for forwarding user data. Besides, the SCEF may serve as a gateway for non-IP communication. Further, the SCEF may also include a function for performing conversion between non-IP communication and IP communication. In addition, a plurality of such gateways may be deployed in the core network_A. The SCEF may be deployed outside the core network or may also be deployed inside the core network.

3. Description of Terms, Identification Information, and Procedures Used in Each Embodiment At least one of terms, identification information, and procedures to be used in each embodiment will be described in advance.

[3.1. Description of Terms and Identification Information in Each Embodiment]

First, highly specialized terms used in each of the embodiments and identification information used in a procedure will be described in advance.

The network refers to at least one part of the access network_B, the core network_B, and the DN. In addition, one or more apparatuses included in the at least one part of the access network_B, the core network_B, and the DN may also be referred to as a network or a network apparatus. That is, a message transmission/reception and/or processing performed by a network may mean a message transmission/reception and/or processing performed by an apparatus (a network apparatus and/or a control apparatus) located within a network. On the contrary, a message transmission/reception and/or processing performed by an apparatus located within a network may also mean a message transmission/reception and/or processing performed by a network.

In addition, a session management (SM) message (also referred to as a non-access-stratum (NAS) SM message) may be a NAS message used in a procedure for the SM, or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification response message, and the like. In addition, the procedure for the SM may include a PDU session establishment procedure.

In addition, a 5G system (5GS) service may be a connection service provided by using the core network_B 190. Furthermore, the 5GS service may be a service different from an EPS service, or may be a service that is the same with an EPS service.

In addition, a non-5GS service may be a service other than the 5GS service, and may include an EPS service and/or a non-EPS service.

In addition, a single registration mode is a mode in which the UE_A 10 maintains a common registration state for a 5GMM state and an EMM state in a case that an N1 mode and an S1 mode are available.

In addition, a dual registration mode is a mode in which the UE_A 10 maintains a registration state independently for the 5GMM state and the EMM state in a case that the N1 mode and the S1 mode are available. Besides, in the case of the dual registration mode, the UE_A 10 may be registered in the network only in the N1 mode (i.e., registered only in the 5GC), may be registered in the network only in the S1 mode (registered only in the EPC), or may be registered in the network in both the N1 mode and the S1 mode (registered in both the 5GC and the EPC).

In addition, in order to achieve interworking between the 5GS and the EPC, the UE that supports both the 5GC and the EPC NAS can operate in the single registration mode or the dual registration mode.

In addition, the S1 mode is a mode in which the UE_A10 is allowed to access the EPC via the E-UTRAN. In other words, the S1 mode may be a mode in which a message is transmitted and/or received by using the S1 interface. In addition, the S1 interface may include an S1-MME interface and an S1-U interface.

In addition, the N1 mode is a mode in which the UE_A10 is allowed to access the 5GC via the 5G access network. In other words, the N1 mode may be a mode in which a message is transmitted and/or received by using the N1 interface.

In addition, an access point name (APN) may be identification information for identifying a core network and/or an external network such as the PDN. Furthermore, the APN can also be used as information for selecting a gateway such as the PGW_A 30/UPF_A 235 to connect to the core network_A_90.

In addition, a packet data network (PDN) type indicates the type of a PDN connection, and includes IPv4, IPv6, IPv4v6, and non-IP. When IPv4 is specified, the IPv4 is used to transmit and/or receive data. When IPv6 is specified, the IPv6 is used to transmit and/or receive data. When IPv4v6 is specified, the IPv4 or IPv6 is used to transmit and/or receive data. When non-IP is specified, a communication is performed by using a communication method other than IPs, rather than by using an IP.

In addition, a protocol data unit/packet data unit (PDU) session may be defined as association between the DN, which provides a PDU connectivity service, and the UE, and may be a connectivity established between the UE and an external gateway. In the 5GS, the UE can establish a PDU session via the access network_B and the core network_B and thus can transmit and/or receive user data to and/or from the DN by using the PDU session. Here, the external gateway may be the UPF, the SCEF, or the like. The UE can transmit and/or receive user data, by using a PDU session, to and/or from an apparatus such as an application server deployed in the DN.

In addition, each apparatus (UE, and/or access network apparatus, and/or core network apparatus) may manage one or more pieces of identification information associated with the PDU session. Further, the identification information may include one or more of a DNN, a QoS rule, a PDU session type, application identification information, NSI identification information, access network identification information, and an SSC mode, or may further include other information. Furthermore, in a case that a plurality of PDU sessions are established, their respective pieces of identification information associated with the PDU sessions may have the same content or different contents.

In addition, a data network name (DNN) may be identification information for identifying a core network and/or an external network such as the DN. Further, the DNN can also be used as information for selecting a gateway such as the PGW_A 30/UPF_A 235 to connect to the core network_B 190. Furthermore, the DNN may be equivalent to an access point name (APN).

In addition, a protocol data unit/packet data unit (PDU) session type indicates the type of a PDU, and includes IPv4, IPv6, Ethernets, and Unstructed. When IPv4 is specified, the IPv4 is used to transmit and/or receive data. When IPv6 is specified, the IPv6 is used to transmit and/or receive data. When Ethernet is specified, an Ethernet frame is transmitted and/or received. Also, Ethernet may indicate a communication in which IP is not used. When Unstructured is specified, a point-to-point (P2P) tunneling technique is used to transmit and/or receive data to and/or from an application server or the like located in the DN. For the P2P tunneling technique, for example, a UDP/IP encapsulation technique may be used. In addition, the PDU session type may also include IP in addition to the above. IP may be specified when the UE is capable of using both IPv4 and IPv6.

In addition, the network slice (NS) is a logical network that provides specific network capabilities and network characteristics. The UE and/or the network can support network slices (NW slices or NSs) in the 5GS.

Besides, a network slice instance (NSI) includes an instance (entity) of a network function (NF) and a set of required resources, and forms a configured network slice. Here, NF refers to a processing function in the network, and is adopted or defined by the 3GPP. The NSI is an entity of one or more NFs included in the core network_B. In addition, the NSI may include a virtual network function (NF) generated by using a network slice template (NST). Here, NST is a logical expression of one or more NFs and associated with a resource request for providing a required communication service or capability. That is, the NSI may be an aggregation including a plurality of NFs in the core network_B 190. In addition, the NSI may also be a logical network configured to distribute user data delivered through a service or the like. The NS includes one or more NFs. The NF included in the NS may or may not be an apparatus that is shared with other NS. The UE and/or an apparatus in the network can be allocated to one or more NSs based on NSSAI and/or S-NSSAI and/or UE usage type and/or registration information such as one or more NSI IDs and/or APNs. Further, the UE usage type is a parameter value included in the registration information of the UE and used for identifying the NSI. The UE usage type may be stored in the HSS. The AMF may select the SMF and the UPF based on the UE usage type.

In addition, single network slice selection assistance information (S-NSSAI) is information for identifying an NS. The S-NSSAI may include only a slice/service type (SST), or may include both the SST and a slice differentiator (SD). Here, the SST is information indicating an operation of an NS expected in terms of function and service. In addition, the SD may be information for interpolating the SST at a time when one NSI is selected from a plurality of NSIs indicated by the SST. The S-NSSAI may be unique information for each PLMN or may be standard information shared by PLMNs. In addition, the network may store one or more S-NSSAI in the registration information of the UE as a default S-NSSAI. In addition, in a case that the S-NSSAI is default S-NSSAI, the network may provide an NS related to the UE when the UE does not transmit valid S-NSSAI to the network in a registration request message.

In addition, network slice selection assistance information (NSSAI) is a collection of S-NSSAI. Each S-NSSAI included in the NSSAI is information for assisting the the access network or the core network to select an NSI. The UE may also store NSSAI allowed by the network for each PLMN. In addition, the NSSAI may be information for selecting the AMF.

Besides, a session and service continuity (SSC) mode indicates a mode of session and service continuity supported by a system and/or each apparatus in the 5G System (5GS). More specifically, the SSC mode may be a mode indicating a type of session and service continuity supported by a PDU session established between the UE_A 10 and the UPF. Besides, the SSC mode may be a mode indicating a type of session and service continuity configured for each PDU session. Furthermore, the SSC mode may include three modes, i.e., SSC mode 1, SSC mode 2, and SSC mode 3. Besides, the SSC mode associated with the PDU session may not be changed as long as the PDU session continues.

In addition, the 5GMM-CONNECTED mode with RRC inactive indication is a state indicating that the state of the NAS layer is a connected state regardless of the state in which the RRC layer is inactive. In other words, the 5GMM-CONNECTED mode with RRC inactive indication is a state in which a radio bearer is released while maintaining the context of the NAS signaling connection and/or the NAS signaling connection.

Besides, a support for the 5GMM-CONNECTED mode with RRC inactive indication may mean that maintaining the state of the NAS layer in the connected state is supported even in a case that a notification indicating the RRC layer being inactive is received from a lower layer. Furthermore, the use of the 5GMM-CONNECTED mode with RRC inactive indication may mean that the state of the NAS layer is maintained in the connected state even in a case that a notification indicating the RRC layer being inactive is received from a lower layer.

The tracking area is a single or multiple ranges that can be indicated by location information of the UE_A 10 and managed by the core network. The tracking area may include a plurality of cells. Further, the tracking area may be a range in which a control message such as a paging message is broadcasted, or may be a range in which the UE_A 10 can move without performing a handover procedure. Furthermore, the tracking area may be a routing area, or may be a location area, or may be the same area as these areas. Hereinafter, the tracking area may be a TA (Tracking Area).

The TA list is a list including one or more TAs assigned by the network to the UE_A 10. In addition, the UE_A 10 can move without performing a tracking area update procedure while moving within one or more TAs included in the TA list. In other words, for the UE_A10, the TA list may also be a group of information indicating areas in which the UE_A10 can move without performing the tracking area update procedure. Besides, the TA list may be expressed as a TAI list including one or more TAIs (tracking area identities), and hereinafter, the TAI list may also be referred to as a TA list.

A local area data network (LADN) is a DN to which the UE can connect only at a specific location, and provides connectivity to a specific DNN (i.e., LADN DNN). The LADN may be a DN that can be connected at a specific location by using a PDU session associated with a specific DNN. Further, the LADN may be a DN that can be connected in a specific location by using a PDU session corresponding to a combination of a specific DNN and a specific S-NSSAI.

The LADN information is information associated with the LADN. The LADN information may be information indicating a specific LADN available to the UE. The LADN information may include LADN DNN and LADN service area information. More specifically, the LADN information may also include one or more pieces of information existing for each LADN (hereinafter, referred to as information indicating LADN). Further, the information indicating LADN may also include LADN DNN and LADN service area information. Here, the LADN DNN may be information that identifies an LADN, may be information that identifies a DN operating as the LADN, or may be a DNN used when a PDU session is established for an LADN.

Besides, when the LADN information is conventional LADN information, the LADN information may be information of the configuration described above. Specifically, when the LADN information is conventional LADN information, the LADN service area may be the conventional LADN service area.

On the contrary, when the LADN information is extended LADN information, the LADN information may be partially extended information of the configuration described above. Specifically, when LADN information is extended LADN information, the LADN service area may be an extended LADN service area. Furthermore, when the LADN information is extended LADN information, the information indicating LADN may further include information indicating a period during which the LADN service area is valid and/or information indicating the granularity of the LADN service area. Further, when the LADN information is extended LADN information, the information indicating LADN may further include the S-NSSAI.

The LADN service area is an area where a PDU session can be established for an LADN. The LADN service area may also be an area that can be connected to an LADN. Furthermore, the LADN service area may be an area indicated by LADN service area information. Here, the LADN service area information may be information identifying an LADN service area, and may be provided as a set of tracking areas or provided as a tracking area identity (TAI) list.

In addition, when the LADN service area is a conventional LADN service area, the LADN service area may be an area including a tracking area belonging to a registration area to which the UE is currently connected. In other words, when the LADN service area is a conventional LADN service area, the LADN service area may also be an area including one or more tracking areas. On the contrary, when the LADN service area is an extended LADN service area, the LADN service area may be an area including the tracking area, or may be an area covered by a part of base stations within the tracking area. Further, when the LADN service area is an extended LADN service area, the LADN service area may be an area having a size other than the area including the tracking area, or may be an area that does not depend on the tracking area. In other words, when the LADN service area is an extended LADN service area, the LADN service area may be an area including one or more tracking areas, or may be an area different from the area including one or more tracking areas.

Furthermore, when the LADN service area is an area including one or more tracking areas, the LADN service area information may also be a tracking area ID list including one or more tracking area IDs. On the contrary, when the LADN service area is an area different from the area including one or more tracking areas, the LADN service area information may be information that requires the assistance of a radio access network (RAN) or may be information that does not require the assistance of the RAN. Here, the information that requires the assistance of the RAN may be cell information, or may also be base station information. Further, the information that requires the assistance of the RAN may be a cell ID, or may be a base station ID. Furthermore, the information that requires the assistance of the RAN is not limited to the above, and may be information defined by the RAN. Moreover, the information that does not require the assistance of the RAN may be physical location information, or may also be location information that can be acquired through an application. Further, the information that does not require the assistance of the RAN is not limited to the above, and may be acquired through means other than the RAN. Here, the RAN may also be expressed as an access network. On the contrary, the access network may also be referred to as a RAN.

The extension of the LADN service area may mean the use of an LADN service area having granularity that is different from that of the conventional LADN service area. Furthermore, the extension of the LADN service area may mean the use of extended LADN information that is different from the conventional LADN information. Furthermore, the extension of the LADN service area may mean the connection to an extended LADN that is different from the conventional LADN.

That is, when each apparatus supports the extension of the LADN service area, an extended LADN service area different from the conventional LADN service area may also be adapted in addition to the conventional LADN service area. Further, when each apparatus supports the extension of the LADN service area, an extended LADN information different from the conventional LADN information may also be used in addition to the conventional LADN information. Furthermore, when each apparatus supports the extension of the LADN service area, an extended LADN different from the conventional LADN may also be connected in addition to the conventional LADN.

On the contrary, when a part of the apparatuses does not support the extension of the LADN service area, an extended LADN service area may not be adapted, and only the conventional LADN service area can be adapted. Further, when a part of the apparatuses does not support the extension of the LADN service area, an extended LADN information may not be used, and only the conventional LADN information can be used. Furthermore, when a part of the apparatuses does not support the extension of the LADN service area, an extended LADN may not be connected, and only the conventional LADN can be connected.

In addition, when each apparatus supports a usage restriction of the extension of the LADN service area, an extended LADN service area may not be adapted, and only the conventional LADN service area can be adapted. Further, when each apparatus supports a usage restriction of the extension of the LADN service area, an extended LADN information may not be used, and only the conventional LADN information can be used. Furthermore, when each apparatus supports a usage restriction of the extension of the LADN service area, an extended LADN may not be connected, and only the conventional LADN can be connected.

On the contrary, when each apparatus does not support a usage restriction of the extension of the LADN service area, an extended LADN service area may be adapted. Further, when each apparatus does not support a usage restriction of the extension of the LADN service area, an extended LADN information may be used. Furthermore, when each apparatus does not support a usage restriction of the extension of the LADN service area, an extended LADN may be connected.

A PDU session for LADN is a PDU session corresponding to a DNN associated with the LADN. A PDU session for LADN may also be a PDU session established for the LADN. In other words, it may be a PDU session established between the UE and the LADN, or it may also be a PDU session for user data communication between the UE and the LADN. In addition, the PDU session for LADN may be a PDU session that can be established only in an LADN service area. In other words, the UE may establish a PDU session for LADN by using a specific DNN at a specific location. Further, in other words, the UE may establish a PDU session for LADN by using a combination of a specific DNN and a specific S-NSSAI at a specific location.

The 1st identification information may be information indicating whether the UE supports the extension of the LADN service area. The 1st identification information may be a bit indicating that the extension of the LADN service area is supported, or may be a bit indicating that the extension of the LADN service area is not supported.

In addition, the 1st identification information may be information indicating whether the UE supports a usage restriction of the extension of the LADN service area. Further, the 1st identification information may be a bit indicating that a usage restriction of the extension of the LADN service area is supported, or may be a bit indicating that a usage restriction of the extension of the LADN service area is not supported.

Furthermore, the 1st identification information may be a bit constituting a 5GMM capability information element that indicates the capability of the UE in the 5G. Moreover, the 1st identification information may be information selected or determined based on the capability information of the UE, and/or the configuration of the UE, and/or the state of the UE, and/or a user policy, and/or an application request.

The 2nd identification information may be an LADN indication. The 2nd identification information may be information indicating a request for LADN information. The 2nd identification information may be information indicating whether to request LADN information. Further, the 2nd identification information may be information indicating a requested LADN DNN. Furthermore, the 2nd identification information may be information indicating a requested LADN service area.

Moreover, the 2nd identification information may be information indicating a request for updating LADN information, or may be information indicating an updated LADN information. Further, the 2nd identification information may be information indicating a request for deleting LADN information.

Furthermore, the 2nd identification information may be a bit constituting a 5GMM capability information element that indicates the capability of the UE in the 5G. Moreover, the 2nd identification information may be information selected or determined based on the capability information of the UE, and/or the configuration of the UE, and/or the state of the UE, and/or a user policy, and/or an application request.

The 11th identification information may be information indicating whether the network supports the extension of the LADN service area. The 11th identification information may be a bit indicating that the extension of the LADN service area is supported, or may be a bit indicating that the extension of the LADN service area is not supported.

In addition, the 11th identification information may be information indicating whether the network supports a usage restriction of the extension of the LADN service area. Further, the 11th identification information may be a bit indicating that a usage restriction of the extension of the LADN service area is supported, or may be a bit indicating that a usage restriction of the extension of the LADN service area is not supported.

Furthermore, the 11th identification information may be a bit constituting a 5GS network feature support information element that indicates the capability of the network in the 5G. Moreover, the 11th identification information may be information selected or determined by the network based on the received 1st identification information, and/or the information corresponding to DN, and/or the information corresponding to NSI, and/or the network capability information, and/or the operator policy, and/or the network state, and/or the user registration information, and/or the like. Further, the 11th identification information may be information selected and determined based on other identification information selected by the network in the present procedure.

The 12th identification information may be LADN information. The 12th identification information may be LADN information allowed by the network, or may be valid LADN information. Further, the 12th identification information may be information transmitted and/or received when the LADN service area exists in the registration area to which the UE is connected.

Furthermore, when the 1st identification information and/or the 11th identification information are/is information indicating that the extension of the LADN service area is supported, the 12th identification information may be extended LADN information that is different from the conventional LADN information. On the contrary, when the 1st identification information and/or the 11th identification information are/is information indicating that the extension of the LADN service area is not supported, the 12th identification information may be the conventional LADN information.

In addition, when the 1st identification information and/or the 11th identification information are/is information indicating that a usage restriction of the extension of the LADN service area is supported, the 12th identification information may be the conventional LADN information. On the contrary, when the 1st identification information and/or the 11th identification information are/is information indicating that a usage restriction of the extension of the LADN service area is not supported, the 12th identification information may be extended LADN information that is different from the conventional LADN information.

Moreover, the 12th identification information may be information selected or determined by the network based on the received identification information, and/or the information corresponding to DN, and/or the information corresponding to NSI, and/or the network capability information, and/or the operator policy, and/or the network state, and/or the user registration information, and/or the like. Further, the 12th identification information may be information selected and determined based on other identification information selected by the network in the present procedure.

The 13th identification information may be information indicating the granularity of the LADN service area. The 13th identification information may also be information indicating the size of the LADN service area. Further, the 13th identification information may be transmitted and/or received in correspondence with the 12th identification information, or may be transmitted and/or received in correspondence with information that is included in the 12th identification information (hereinafter, referred to as information indicating LADN) and exists for each LADN. Further, the 13th identification information may be transmitted and/or received for each piece of information indicating LADN. Here, the 13th identification information may be different for each piece of information indicating LADN, or may be the same among multiple pieces of information indicating LADN.

Besides, when the 13th identification information is transmitted and/or received in correspondence with the information indicating LADN, the thirteenth identification information may be information indicating the granularity of the LADN service area information (hereinafter, referred to as LADN service area information) included in the information indicating LADN.

For example, the 13th identification information may be information indicating that an area including one or more tracking areas is used as the LADN service area. Here, the LADN service area information may be set with a tracking area ID list including one or more tracking area IDs.

Further, the 13th identification information may also be information indicating that an area different from the area including one or more tracking areas is used as the LADN service area. Here, the LADN service area information may be set with information that requires the assistance of the RAN, or may also be set with information that does not require the assistance of the RAN.

Further, the 13th identification information may be information indicating that an area covered by a part of the base stations in the tracking area is used as the LADN service area. Here, the LADN service area information may also be set with cell IDs and/or a cell ID list including one or more cell IDs.

Furthermore, the 13th identification information may be information indicating that an area set without depending on a tracking area is used as the LADN service area. Here, the LADN service area information may be set with physical location information.

Here, when the 13th identification information is not transmitted and/or received and/or when the 13th identification information is invalid information, an area including one or more tracking areas may be used as the LADN service area. Furthermore, the LADN service area information may be set with a tracking area ID list including one or more tracking area IDs. Besides, the granularity indicated by the 13th identification information and/or the LADN service area information may not be limited to the above.

Further, the 13th identification information may be information selected or determined by the network based on the received 1st identification information, and/or the information corresponding to DN, and/or the information corresponding to NSI, and/or the network capability information, and/or the operator policy, and/or the network state, and/or the user registration information, and/or the like. Further, the 13th identification information may be information selected and determined based on other identification information selected by the network in the present procedure.

The 14th identification information may be information indicating the period during which the LADN service area is valid. The 14th identification information may be information indicating whether the LADN service area is currently valid. Further, the 14th identification information may be transmitted and/or received in correspondence with the 12th identification information, or may be transmitted and/or received in correspondence with information that is included in the 12th identification information (hereinafter, referred to as information indicating LADN) and exists for each LADN. Further, the 14th identification information may be transmitted and/or received for each piece of information indicating LADN. Here, the 14th identification information may be different for each piece of information indicating LADN, or may be the same among multiple pieces of information indicating LADN.

Here, the information indicating the period during which the LADN service area is valid may be information indicating the time during which the LADN service area is valid, or may be information indicating a period expressed by a specific date and time. Further, the information indicating the period during which the LADN service area is valid may be information indicating a specific time zone, or may be information indicating a specific day of the week. Further, the information indicating the period during which the LADN service area is valid may be information indicating a specific day, or may be information indicating a specific week. Further, the information indicating the period during which the LADN service area is valid may be information indicating a specific month, or may be information indicating a specific year.

Here, when the 14th identification information is not transmitted and/or received and/or when the 14th identification information is invalid information, the period during which the LADN service area is valid may be a period ended until the LADN information and/or the information indicating LADN are/is updated. Further, the information indicating the period during which the LADN service area is valid is not limited to the above.

Further, the 14th identification information may be information selected or determined by the network based on the received 1st identification information, and/or the information corresponding to DN, and/or the information corresponding to NSI, and/or the network capability information, and/or the operator policy, and/or the network state, and/or the user registration information, and/or the like. Further, the 14th identification information may be information selected and determined based on other identification information selected by the network in the present procedure.

[3.2. Description of Procedures in Each Embodiment]

Next, procedures used in each embodiment will be described. Besides, the procedures used in each embodiment include a registration procedure, a PDU session establishment procedure, and a generic UE configuration update procedure. Each procedure will be described below.

Besides, in each embodiment, an example will be described under a case that the HSS and the UDM, the PCF and the PCRF, the SMF and the PGW-C, and the UPF and the PGW-U are respectively configured as the same apparatus (i.e., the same physical hardware, the same logical hardware, or the same software) as shown in FIG. 2. However, the contents described in the present embodiment can also be applied to the case where these apparatuses are configured as different apparatuses (i.e., different physical hardware, different logical hardware, or different software).

For example, data may be transmitted and/or received directly between these apparatuses, may be transmitted and/or received via the N26 interface between the AMF and the MME, or may be transmitted and/or received via the UE.

[3.2.1. Registration Procedure]

First, a registration procedure will be described with reference to FIG. 6. The registration procedure is a procedure in the 5GS. The present procedure hereinafter refers to a registration procedure. The registration procedure is a procedure initiated by the UE to register to the access network_B, and/or the core network_B, and/or the DN. If the UE is not registered in the network, the UE can perform the present procedure at any time, for example, when power is turned on. In other words, if the UE is in a deregistered state (RM-DEREGISTERED state), the UE can initiate the present procedure at any time. In addition, each apparatus (particularly, the UE and the AMF) can transition to a registered state (RM-REGISTERED state) based on completion of the registration procedure.

Furthermore, the registration procedure may be a procedure for updating location registration information of the UE in the network, and/or for regularly notifying, by the UE, the network of a state of the UE, and/or for updating specific parameters related to the UE in the network.

The UE may also initiate the registration procedure when the UE performs mobility across TAs. In other words, the UE may initiate the registration procedure when the UE moves to a TA different from the TA indicated on a TA list that the UE is holding. Further, the UE may initiate the present procedure when a running timer expires. Furthermore, the UE may initiate the registration procedure when a context of each apparatus needs to be updated due to disconnection or deactivation of a PDU session. Moreover, the UE may initiate the registration procedure when a change occurs in capability information and/or a preference concerning PDU session establishment of the UE. Further, the UE may initiate the registration procedure regularly. Furthermore, the UE may also initiate the registration procedure based on the completion of the UE configuration update procedure. Besides, the UE can perform the registration procedure at any timing without being limited to the above.

Further, the UE may initiate the registration procedure regularly even if the UE is in the registered state. In other words, the UE may also initiate the registration procedure based on the expiration of a timer. Furthermore, the UE may also initiate the registration procedure in a state where LADN information is stored. Moreover, the UE may also initiate the registration procedure in a state where a PDU session is established. Besides, the PDU session may be a PDU session corresponding to LADN information, or may also be a PDU session for LADN. Further, the PDU session may also be a PDU session corresponding to NSSAI.

Besides, the registration procedure performed based on mobility of the UE and the registration procedure performed regularly may also be expressed as a registration procedure for mobility and registration update. In other words, the registration procedure for mobility and registration update may be a registration procedure performed based on mobility of the UE or may be a registration procedure performed regularly. Further, the registration procedure for mobility and registration update may also be a registration procedure performed based on configuration update of the UE. Furthermore, the registration procedure for mobility and registration update may also be a registration procedure performed for the purpose of establishing a communication path for transmitting and/or receiving user data. Further, the registration procedure for mobility and registration update may also be a registration procedure performed based on a request from the network. Moreover, in other words, the registration procedure for mobility and registration update may also be a registration procedure other than the initial registration procedure. Hereinafter, the registration procedure for mobility and registration update may also be expressed as the present procedure.

Next, each step of the registration procedure will be described. In addition, the registration procedure described below may be an initial registration procedure, or may also be a registration procedure for mobility and registration update.

First, the UE initiates the registration procedure by transmitting a registration request message to the AMF (S800), (S802), and (S804). Specifically, the UE transmits an RRC message including a registration request message to the 5G AN (or gNB) (S800). Besides, the registration request message is a NAS message. In addition, the RRC message may also be a control message that is transmitted and/or received between the UE and the 5G AN (or gNB). In addition, the NAS message is processed by the NAS layer, and the RRC message is processed by the RRC layer. Besides, the NAS layer is a layer higher than the RRC layer.

Here, although the UE can at least include the 1st identification information in the registration request message and/or the RRC message and transmit it, the UE can also include the 1st identification information in a control message different from the above messages, for example, a control message of a layer lower than the RRC layer (e.g., an MAC layer, an RLC layer, and a PDCP layer) and transmit it. Besides, the UE may, by transmitting the identification information, indicate that the UE supports each function, or indicate a request of the UE. Further, when a plurality of pieces of identification information are transmitted and/or received, two or more pieces of identification information of these pieces of identification information may be configured as one or more pieces of identification information. Besides, the information indicating support of each function and information indicating a request for use of each function may be transmitted and/or received as the same identification information, or may be transmitted and/or received as different identification information.

When the UE supports the extension of the LADN service area, the UE may set the information, which indicates that the extension of the LADN service area is supported, as the 1st identification information, or may have the 1st identification information, which indicates that the extension of the LADN service area is supported, be included in the registration request message and transmitted. On the contrary, when the UE does not support the extension of the LADN service area, the UE may set the information, which indicates that the extension of the LADN service area is not supported, as the 1st identification information, or may have the 1st identification information, which indicates that the extension of the LADN service area is not supported, be included in the registration request message and transmitted, or may not transmit the 1st identification information.

In addition, when the UE supports a usage restriction of the extension of the LADN service area, the UE may set the information, which indicates that the usage restriction of the extension of the LADN service area is supported, as the 1st identification information, or may have the 1st identification information, which indicates that the usage restriction of the extension of the LADN service area is supported, be included in the registration request message and transmitted. On the contrary, when the UE does not support a usage restriction of the extension of the LADN service area, the UE may set the information, which indicates that the usage restriction of the extension of the LADN service area is not supported, as the 1st identification information, or may have the 1st identification information, which indicates that the usage restriction of the extension of the LADN service area is not supported, be included in the registration request message and transmitted, or the UE may not transmit the 1st identification information.

Further, the UE may, by transmitting the 1st identification information, indicate that the UE supports the extension of the LADN service area. Here, the 1st identification information may be information indicating that the extension of the LADN service area is supported.

On the contrary, the UE may, by transmitting the 1st identification information, indicate that the UE supports a usage restriction of the extension of the LADN service area. Here, the 1st identification information may be information indicating that a usage restriction of the extension of the LADN service area is supported.

In addition, the UE may transmit an SM message (e.g., a PDU session establishment request message) included in the registration request message, or transmits the SM message (e.g., the PDU session establishment request message) together with the registration request message, so as to initiate a PDU session establishment procedure during the registration procedure.

If an RRC message including the registration request message is received, then the 5G AN (or gNB) selects the AMF to which the registration request message is forwarded (S802). Besides, the 5G AN (or gNB) can select the AMF based on information contained in the registration request message and/or the RRC message. The 5G AN (or gNB) retrieves the registration request message from the received RRC messages and forwards the registration request message to the selected AMF (S804).

When the AMF receives the registration request message, the AMF can perform the first condition determination. The first condition determination is to determine whether the network (or the AMF) accepts a request of the UE. The AMF initiates the procedure (A) of FIG. 6 when the first condition determination is true, and initiates the procedure (B) of FIG. 6 when the first condition determination is false.

Besides, the first condition determination may be performed based on reception of the registration request message and/or each piece of identification information included in the registration request message, and/or subscriber information, and/or network capability information and/or an operator policy and/or a network status and/or user registration information and/or context held by the AMF, and/or the like. For example, when the network allows the request of the UE, the first condition determination is true; and when the network does not allow the request of the UE, the first condition determination is false. In addition, when the network serving as a registration destination of the UE and/or an apparatus in the network supports a function requested by the UE, the first condition determination may be true; and when the network and/or the apparatus does not support the function requested by the UE, the first condition determination may be false. Further, when the identification information to be transmitted and/or received is allowed, the first condition determination may be true, and when the identification information to be transmitted and/or received is not allowed, the first condition determination may be false. Besides, conditions for determining whether the first condition determination is true or false may not be limited to the above.

First, a case in which the first condition determination is true will be described. The AMF can first perform fourth condition determination in the procedure (A) of FIG. 6. The fourth condition determination is to determine whether the AMF transmits and/or receives an SM message to/from the SMF.

In addition, the fourth condition determination may be performed based on whether the AMF has received the SM message. In addition, the fourth condition determination may also be performed based on whether the SM message is included in the registration request message. For example, when the AMF has received the SM message and/or the SM message is included in the registration request message, the fourth condition determination may be true; and when the AMF has not received the SM message and/or the SM message is not included in the registration request message, the fourth condition determination may be false. Besides, conditions for determining whether the fourth condition determination is true or false may not be limited to the above.

When the fourth condition determination is true, the AMF selects the SMF and transmits and/or receives the SM message to and/or from the selected SMF, and when the fourth condition determination is false, the AMF does not perform the transmission and/or reception of the SMF message (S806). In addition, when the AMF receives the SM message indicating rejection from the SMF even in a case that the fourth condition determination is true, the AMF may cease the procedure (A) of FIG. 6. Here, the AMF can initiate the procedure (B) of FIG. 6.

Further, in S806, the AMF can notify the SMF of the identification information received in the registration request message when the AMF transmits and/or receives the SM message to and/or from the SMF. The SMF can obtain the identification information received from the AMF by transmitting and/or receiving SM messages to and/or from the AMF.

Next, the AMF transmits a registration accept message to the UE via the 5G AN (or gNB) as a response message to the registration request message based on the reception of the registration request message and/or the completion of the transmission and/or reception of the SM message to and/or from the SMF (S808). For example, when the fourth condition determination is false, the AMF may transmit the registration accept message based on the reception of the registration request message from the UE. In addition, when the fourth condition determination is true, the AMF may also transmit the registration accept message based on the completion of the transmission and/or reception of the SM message to and/or from the SMF. Besides, the registration accept message is a NAS message transmitted and/or received in the N1 interface, but it is included in the RRC message and transmitted and/or received between the UE and the 5G AN (gNB).

The AMF may include at least one or more pieces of identification information among the 1st to the 14th identification information in the registration accept message, and transmit it. Besides, the AMF may, by transmitting the identification information, indicate that the network supports each function, or indicate that the request of the UE has been accepted. Further, when a plurality of pieces of identification information are transmitted and/or received, two or more pieces of identification information of these pieces of identification information may be configured as one or more pieces of identification information. Besides, the information indicating support of each function and information indicating a request for use of each function may be transmitted and/or received as the same identification information, or may be transmitted and/or received as different identification information.

When the AMF supports the extension of the LADN service area, the AMF may set the information, which indicates that the extension of the LADN service area is supported, as the 11th identification information, or may have the 11th identification information, which indicates that the extension of the LADN service area is supported, be included in the registration accept message and transmitted. On the contrary, when the AMF does not support the extension of the LADN service area, the AMF may set the information, which indicates that the extension of the LADN service area is not supported, as the 11th identification information, or may have the 11th identification information, which indicates that the extension of the LADN service area is not supported, be included in the registration accept message and transmitted, or may not transmit the 11th identification information.

In addition, when the AMF supports a usage restriction of the extension of the LADN service area, the AMF may set the information, which indicates that the usage restriction of the extension of the LADN service area is supported, as the 11th identification information, or may have the 11th identification information, which indicates that the usage restriction of the extension of the LADN service area is supported, be included in the registration accept message and transmitted. On the contrary, when the AMF does not support a usage restriction of the extension of the LADN service area, the AMF may set the information, which indicates that the usage restriction of the extension of the LADN service area is not supported, as the 11th identification information, or may have the 11th identification information, which indicates that the usage restriction of the extension of the LADN service area is not supported, be included in the registration accept message and transmitted, or the UE may not transmit the 11th identification information.

Further, the AMF may, by transmitting the 11th identification information, indicate that the network supports the extension of the LADN service area. Further, the AMF may, by transmitting the 11th identification information, indicate that the extension of the LADN service area can be used. Further, the AMF may, by transmitting the 11th identification information, indicate that the network allows the use of the extension of the LADN service area. Here, the 11th identification information may be information indicating that the extension of the LADN service area is supported.

On the contrary, the AMF may indicate that the network does not support the extension of the LADN service area by transmitting the 11th identification information indicating that the extension of the LADN service area is not supported, or by not transmitting the 11th identification information. Further, the AMF may indicate that the extension of the LADN service area cannot be used by transmitting the 11th identification information indicating that the extension of the LADN service area is not supported, or by not transmitting the 11th identification information. Furthermore, the AMF may indicate that the network does not allow the use of the extension of the LADN service area by transmitting the 11th identification information indicating that the extension of the LADN service area is not supported, or by not transmitting the 11th identification information.

Further, the AMF may, by transmitting the 11th identification information, indicate that the network supports a usage restriction of the extension of the LADN service area. Further, the AMF may, by transmitting the 11th identification information, indicate that the use of the extension of the LADN service area is restricted. Here, the 11th identification information may be information indicating that a usage restriction of the extension of the LADN service area is supported.

On the contrary, the AMF may indicate that the network does not support a usage restriction of the extension of the LADN service area by transmitting the 11th identification information indicating that the usage restriction of the extension of the LADN service area is not supported, or by not transmitting the 11th identification information. Further, the AMF may indicate that the use of the extension of the LADN service area is not restricted by transmitting the 11th identification information indicating that a usage restriction of the extension of the LADN service area is not supported, or by not transmitting the 11th identification information.

Here, the AMF may transmit the 11th identification information based on the 1st identification information. Specifically, when the 1st identification information is information indicating that the extension of the LADN service area is supported, the AMF may transmit the 11th identification information, which indicates that the extension of the LADN service area is supported, to the UE. On the contrary, when the 1st identification information is information indicating that the extension of the LADN service area is not supported, the AMF may transmit the 11th identification information, which indicates that the extension of the LADN service area is not supported, to the UE.

Furthermore, when the AMF determines to restrict the use of the extension of the LADN service area in a case that the 1st identification information is information indicating the usage restriction of the extension of the LADN service area is supported, the AMF may set the information, which indicates the usage restriction of the extension of the LADN service area, as the 11th identification information, or may transmit the 11th identification information, which indicates the usage restriction of the extension of the LADN service area, to the UE. On the contrary, when the 1st identification information is information indicating that the extension of the LADN service area is not supported, the AMF may not transmit the 11th identification information.

Further, the AMF may, by transmitting the 12th identification information, indicate that the network supports the LADN, or indicate that a connection to the LADN is allowed. Furthermore, the AMF may, by transmitting the 12th identification information, notify the UE of a list of DNNs that can be used for connection to the LADN and/or an LADN service area serving as an area that can be connected to an LADN. Moreover, the AMF may, by transmitting the 12th identification information, notify the UE of one or more S-NSSAI that can be used for connection to the LADN. In addition, the S-NSSAI that can be used in the connection to the LADN, and the DNN and/or the LADN service area that can be used in the connection to the LADN may also be associated with each other.

Here, the AMF may transmit the 12th identification information based on the 1st identification information. Specifically, when the 1st identification information is information indicating that the extension of the LADN service area is supported, the AMF may set an extended LADN service area as the LADN service area, may set extended LADN information as the LADN information, or may transmit the set LADN information as the 12th identification information to the UE. On the contrary, when the 1st identification information is information indicating that the extension of the LADN service area is not supported, the AMF may set a conventional LADN service area as the LADN service area, may set conventional LADN information as the LADN information, or may transmit the set LADN information as the 12th identification information to the UE.

On the contrary, the AMF may, by not transmitting the 12th identification information, indicate that the network does not support the LADN, or indicate that a connection to the LADN is not allowed. Further, the AMF may, by not transmitting the 12th identification information, indicate that the LADN information stored by the UE is invalid, or instruct the UE to invalidate the LADN information stored by the UE. Furthermore, the AMF may, by not transmitting the 12th identification information, indicate that the LADN information stored by the UE needs to be deleted, or instruct the UE to delete the LADN information stored by the UE.

Furthermore, the AMF may, by transmitting the 12th identification information whose content is null, indicate that the network does not support the LADN, or indicate that a connection to the LADN is not allowed. Moreover, the AMF may, by not transmitting the 12th identification information whose content is null, indicate that the LADN information stored by the UE is invalid, or instruct the UE to invalidate the LADN information stored by the UE. Furthermore, the AMF may, by not transmitting the 12th identification information whose content is null, indicate that the LADN information stored by the UE needs to be deleted, or instruct the UE to delete the LADN information stored by the UE.

Here, the AMF may transmit the 1st identification information based on the 2nd identification information. Specifically, when the 2nd identification information indicates a request for LADN information, the AMF may have the 12th identification information be included in the registration accept message, or may transmit the 12th identification information to the UE. Further, when the 2nd identification information indicates a request for updating LADN information, the AMF may have the 12th identification information be included in the registration accept message, or may transmit the 12th identification information to the UE. On the contrary, when the 2nd identification information indicates a request for deleting LADN information, the AMF may not have the 12th identification information be included in the registration accept message, or may not transmit the 12th identification information to the UE. Further, when the 2nd identification information indicates a request for deleting LADN information, the AMF may have the 12th identification information, whose content is null, be included in the registration accept message, or may transmit the 12th identification information, whose content is null, to the UE.

Furthermore, when the AMF intends to invalidate the LADN information stored by the UE, the AMF may not have the 12th identification information be included in the registration accept message, or may not transmit the 12th identification information to the UE. Moreover, when the AMF intends to invalidate the LADN information stored by the UE, the AMF may have the 12th identification information, whose content is null, be included in the registration accept message, or may transmit the 12th identification information, whose content is null, to the UE. Besides, when the AMF intends to delete the LADN information stored by the UE, the AMF may not have the 12th identification information be included in the registration accept message, or may not transmit the 12th identification information to the UE. Further, when the AMF intends to delete the LADN information stored by the UE, the AMF may have the 12th identification information, whose content is null, be included in the registration accept message, or may transmit the 12th identification information, whose content is null, to the UE.

Furthermore, when the AMF does not include the 12th identification information in the registration accept message during the registration procedure for mobility and registration update, the AMF may recognize old LADN information as invalid or may delete the old LADN information. Here, when a PDU session for LADN has been established, the AMF may locally release the PDU session for LADN, or may also request the SMF to locally release the PDU session for LADN.

More specifically, when the AMF does not include the 12th identification information in the registration accept message during the registration procedure for mobility and registration update, the AMF may recognize old LADN information as invalid or may delete the old LADN information. Here, when one or more PDU sessions for an LADN has been established, the AMF may locally release all PDU sessions for the LADN, or may also request the SMF to locally release all PDU sessions for the LADN.

Furthermore, when the AMF does not include the 12th identification information in the registration accept message during the registration procedure for mobility and registration update, the AMF may recognize old LADN information as invalid or may delete the old LADN information. Here, when a PDU session for LADN has been established, the AMF may also request the SMF to release the PDU session for LADN. Here, the SMF may also initiate a PDU session release procedure requested by the network.

More specifically, when the AMF does not include the 12th identification information in the registration accept message during the registration procedure for mobility and registration update, the AMF may recognize old LADN information as invalid or may delete the old LADN information. Here, when one or more PDU sessions for an LADN has been established, the AMF may also request the SMF to release all PDU sessions for the LADN. Here, the SMF may also initiate a PDU session release procedure requested by the network.

Further, when the LADN information corresponding to the PDU session for LADN is not included in the registration accept message, the AMF may recognize old LADN information as invalid or may delete the old LADN information. Here, the AMF may locally release the PDU session for LADN, or may also request the SMF to locally release the PDU session for LADN.

Further, when the LADN information corresponding to the PDU session for LADN is not included in the registration accept message, the AMF may recognize old LADN information as invalid or may delete the old LADN information. Here, the AMF may also request the SMF to release the PDU session for LADN.

Furthermore, when the LADN information corresponding to the PDU session for LADN is not included in the registration accept message, the AMF may recognize old LADN information as invalid or may delete the old LADN information. Here, the AMF may also request the SMF to release the PDU session for LADN. Here, the SMF may also initiate a PDU session release procedure requested by the network.

Furthermore, when the LADN information corresponding to the PDU session for LADN is not included in the registration accept message, the AMF may recognize old LADN information as invalid or may delete the old LADN information. Here, the AMF may also request the SMF to release the PDU session for LADN. Here, the SMF may also initiate a PDU session release procedure requested by the network.

Further, the AMF may also indicate the granularity of the LADN service area by transmitting the 13th identification information. More specifically, the AMF may, by transmitting the 13th identification information together with the 12th identification information, indicate the granularity of the LADN service area indicated by the LADN service area information included in the LADN information indicated by the 12th identification information, or notify the UE of an area that can be used as the LADN service area. Specifically, the AMF may, by transmitting the 13th identification information together with the 12th identification information, indicate that the LADN service area indicated by the LADN service area information included in the 12th identification information includes one or more tracking areas, or indicate that the LADN service area is an area that is different from an area including one or more tracking areas. Furthermore, the AMF may, by transmitting the 13th identification information together with the 12th identification information, indicate that a tracking area ID list is included as the LADN service area information, or indicate that the information that requires the assistance of RAN is included as the LADN service area information, or indicate that the information that does not require the assistance of RAN is included as the LADN service area information.

Here, the AMF may determine whether to transmit the 13th identification information based on the 1st identification information. Specifically, when the 1st identification information is information indicating that the extension of the LADN service area is supported, the AMF may transmit the 13th identification information to the UE. On the contrary, when the 1st identification information is information indicating that the extension of the LADN service area is not supported, the AMF may not transmit the 13th identification information to the UE.

Further, the AMF may, by transmitting the 14th identification information, indicate a period during which the LADN service area is valid. More specifically, the AMF may also, by transmitting the 14th identification information together with the 12th identification information, indicate a period during which the LADN service area indicated by the LADN service area information included in the LADN information indicated by the 12th identification information is valid.

Here, the AMF may determine whether to transmit the 14th identification information based on the 1st identification information. Specifically, when the 1st identification information is information indicating that the extension of the LADN service area is supported, the AMF may transmit the 14th identification information to the UE. On the contrary, when the 1st identification information is information indicating that the extension of the LADN service area is not supported, the AMF may not transmit the 14th identification information to the UE.

Furthermore, the AMF may, by transmitting the 11th identification information, and/or the 13th identification information, and/or the 14th identification information together with the 12th identification information, indicate that extended LADN information and/or an extended LADN service area can be used, or notify the UE of LADN information and/or LADN service area information that can be used. Here, the 11th identification information may be information indicating that the extension of the LADN service area is supported, and the 12th identification information may be extended LADN information.

On the contrary, the AMF may also, by transmitting the 11th identification information and/or the 12th identification information without transmitting the 13th identification information and/or the 14th identification information, indicate that extended LADN information and/or an extended LADN service area cannot be used. In other words, the AMF may also, by transmitting the 11th identification information and/or the 12th identification information without transmitting the 13th identification information and/or the 14th identification information, indicate that conventional LADN information and/or a conventional LADN service area can be used, or notify the UE of LADN information and/or LADN service area information that can be used. Here, the 11th identification information may be information indicating that the extension of the LADN service area is not supported, and the 12th identification information may be conventional LADN information.

Further, the AMF may also, by transmitting the 12th identification information without transmitting the 11th identification information and/or the 13th identification information, and/or the 14th identification information, indicate that the extended LADN information and/or the extended LADN service area cannot be used. In other words, the AMF may also, by transmitting the 12th identification information without transmitting the 11th identification information and/or the 13th identification information, and/or the 14th identification information, indicate that conventional LADN information and/or a conventional LADN service area can be used, or notify the UE of LADN information and/or LADN service area information that can be used. Here, the 12th identification information may be conventional LADN information.

Besides, the AMF may select and determine which of the 11th to 14th identification information is to be included in the registration accept message based on each piece of the received identification information, and/or the subscriber information, and/or the network capability information, and/or the operator policy, and/or the network status, and/or the user registration information, and/or the context held by the AMF, and/or the like.

In addition, the AMF may transmit an SM message (e.g., a PDU session establishment accept message) included in the registration accept message, or transmit the SM message (e.g., a PDU session establishment accept message) together with the registration accept message. However, the transmission method may also be performed when the registration request message includes an SM message (e.g., a PDU session establishment request message) and the fourth condition is determined to be true. In addition, that transmission method may be perform when an SM message (e.g., a PDU session establishment request message) is included together with the registration request message, and the fourth condition is determined to be true. The AMF can indicate the acceptance of the procedure for SM in the registration procedure by performing such a transmission method.

In addition, the AMF may indicate that the request of the UE has been accepted by transmitting the registration accept message based on each piece of the received identification information, and/or the subscriber information, and/or the network capability information, and/or the operator policy, and/or the network status, and/or the user registration information, and/or the context held by the AMF, and/or the like.

Further, the AMF may transmit a registration accept message that includes information indicating that a part of the request of the UE is rejected, or may transmit information indicating that a part of the request of the UE is rejected, so as to indicate the reason why a part of the request of the UE is rejected. Furthermore, the UE may identify the reason why a part of the request (s) of the UE is rejected by receiving information indicating that a part of the request of the UE is rejected. Besides, the rejection reason may be information indicating that the content indicated by the identification information received by the AMF is not allowed.

The UE receives the registration accept message via the 5G AN (gNB) (S808). The UE can, by receiving a registration accept message, recognize that the UE request of the registration request message has been accepted and recognize the contents of various identification information included in the registration accept message.

The UE can further transmit a registration complete message to the AMF via the 5G AN (gNB) as a response message in response to the registration accept message (S810). Besides, when the UE receives an SM message such as a PDU session establishment accept message, the UE may transmit the registration complete message that includes an SM message such as a PDU session establishment complete message, or may indicate that the procedure for SM has been completed by including the SM message. Here, the registration complete message is a NAS message transmitted and/or received in the N1 interface, but it is included in the RRC message and transmitted and/or received between the UE and the 5G AN (gNB).

The AMF receives the registration complete message via the 5G AN (gNB) (S810). In addition, each apparatus completes the procedure (A) of FIG. 6 based on the transmission and/or the reception of the registration accept message and/or the registration completion message.

Next, a case in which the first condition determination is false will be described. In the procedure (B) of FIG. 6, the AMF transmits a registration reject message to the UE via the 5G AN (gNB) as a response message in response to the registration request message (S812). Here, the registration reject message is a NAS message transmitted and/or received in the N1 interface, but it is included in the RRC message and transmitted and/or received between the UE and the 5G AN (gNB).

Besides, the AMF may, by transmitting a registration reject message, indicate that the UE request of the registration request message is rejected. Further, the AMF may transmit the registration rejection message that includes information indicating a rejection reason, or may indicate the rejection reason by transmitting the rejection reason. Furthermore, the UE may identify the reason why the request of the UE is rejected by receiving information indicating the reason why the request of the UE is rejected. Besides, the rejection reason may be information indicating that the content indicated by the identification information received by the AMF is not allowed.

The UE receives the registration reject message via the 5G AN (gNB) (S812). The UE can, by receiving the registration reject message, recognize that the UE request of the registration request message has been rejected and recognize the contents of various identification information included in the registration reject message. In addition, after transmitting the registration request message, the UE may recognize that the request of the UE is rejected if the UE does not receive the registration reject message even after a predetermined period. Each apparatus completes the process (B) in the present procedure based on the transmission and/or the reception of the registration reject message.

Figure 6:
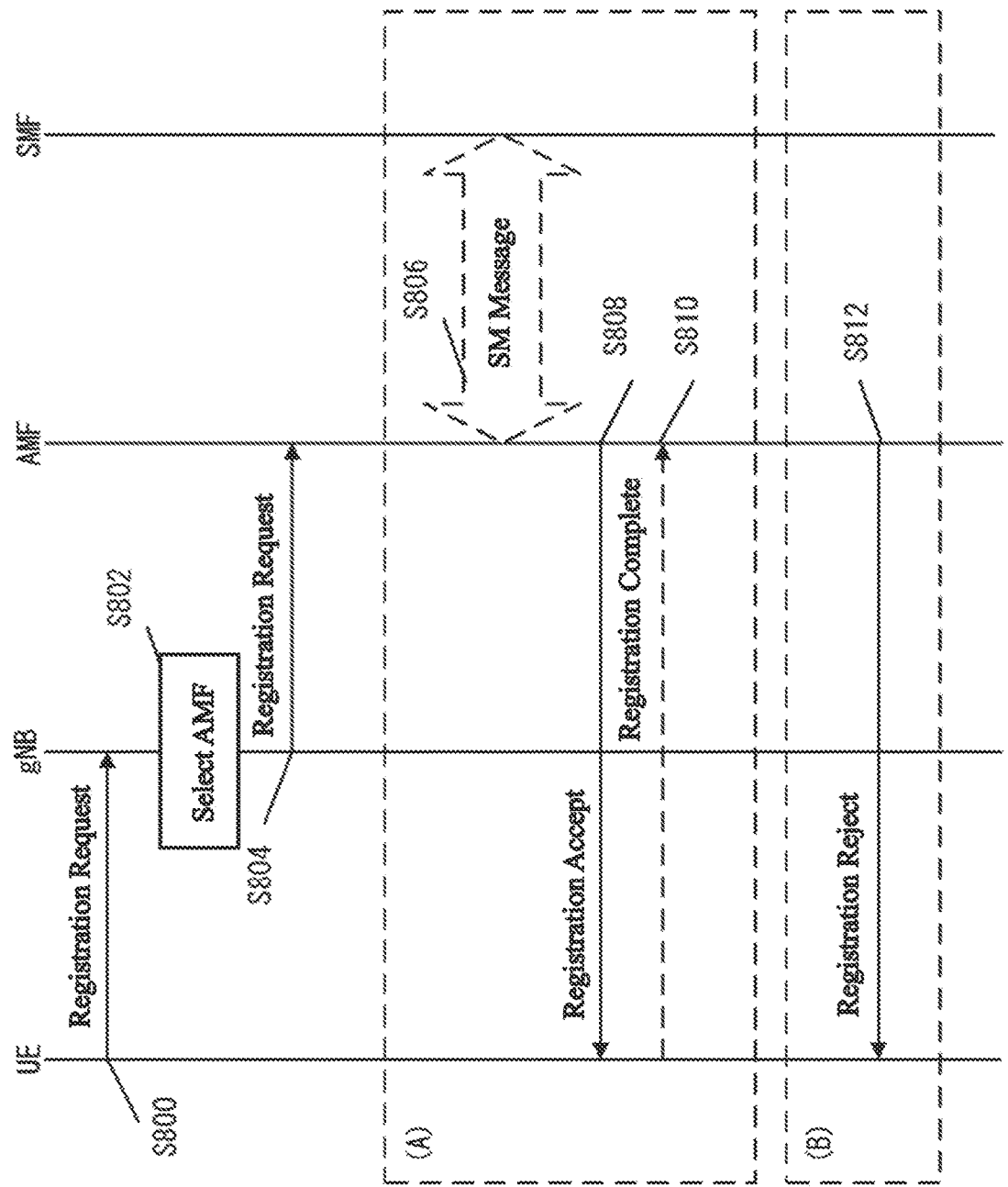
FIG. 6 is a diagram for illustrating a registration procedure.

The procedure (B) of FIG. 6 may be sometimes initiated when the procedure (A) of FIG. 6 is terminated. In the procedure of FIG. 6(A), when the fourth condition determination is true, the AMF may transmit the registration reject message that includes an SM message indicating a rejection such as a PDU session establishment reject message, or may indicate that the procedure for SM is rejected by including the SM message indicating the rejection. Here, the UE may further receive the SM message indicating the rejection such as a PDU session establishment reject message, or may also recognize that the procedure for SM is rejected.

Each apparatus completes the registration procedure based on the completion of the procedures (A) and (B) of FIG. 6. Besides, each apparatus may transition to a state in which the UE is registered in the network (RM_REGISTERED state) based on the completion of the procedure (A) of FIG. 6, or may maintain a state in which the UE is not registered in the network (RM_DEREGISTERED state) based on the completion of the procedure (B) of FIG. 6, or may transition to a state in which the UE is not registered in the network. In addition, a transition of each apparatus to each state may be performed based on completion of the registration procedure, or may be performed based on establishment of a PDU session.

Further, each apparatus may perform processing based on information transmitted and/or received in the registration procedure according to the completion of the registration procedure. For example, when the information that indicating that a part of the request of the UE is rejected is transmitted and/or received, the reason why the request of the UE is rejected may also be identified. Further, based on the reason why the request of the UE is rejected, each apparatus may perform the present procedure again, and may perform a registration procedure for the core network_B or another cell.

Furthermore, based on the completion of the registration procedure, the UE may store the identification information received together with the registration accept message and/or the registration reject message, or may recognize the determination of the network.

For example, when the UE receives the 11th identification information, the UE may recognize that the network supports the extension of the LADN service area. Further, when the UE receives the 11th identification information, the UE may recognize that the use of the extension of the LADN service area is allowed. In other words, when the UE receives the 11th identification information, the UE may recognize that not only an area including one or more tracking areas but also an area different from the area including one or more tracking areas can be set as an LADN service area or used as an LADN service area. When the UE receives the 11th identification information, the UE may recognize that the LADN service area can be changed over time. In these cases, the 11th identification information may be information indicating that the extension of the LADN service area is supported. Further, in these cases, the UE may use the extended LADN information, and/or the extended LADN service area to establish a PDU session for LADN, or may also perform communication with the LADN.

On the contrary, when the UE receives the 11th identification information indicating that the extension of the LADN service area is not supported, or when the UE does not receive the 11th identification information, the UE may recognize that the network does not support the extension of the LADN service area. Further, when the UE receives the 11th identification information indicating that the extension of the LADN service area is not supported, or when the UE does not receive the 11th identification information, the UE may recognize that the use of the extension of the LADN service area is not allowed. In the other words, when the UE receives the 11th identification information indicating that the extension of the LADN service area is not supported, or when the UE does not receive the 11th identification information, the UE may recognize that only an area including one or more tracking areas can be set as an LADN service area, or may recognize that only an area including one or more tracking areas can be used as an LADN service area. When the UE receives the 11th identification information indicating that the extension of the LADN service area is not supported, or when the UE does not receive the 11th identification information, the UE may recognize that the LADN service area cannot be changed over time. In these cases, the UE may use conventional LADN information, and/or a conventional LADN service area to establish a PDU session for LADN, or may also perform communication with the LADN.

Further, when the UE receives the 11th identification information, the UE may recognize that the network supports a usage restriction of the extension of the LADN service area. Furthermore, when the UE receives the 11th identification information, the UE may recognize that the use of the extension of the LADN service area is restricted. Here, the 11th identification information may be information indicating that a usage restriction of the extension of the LADN service area is supported.

On the contrary, when the UE receives the 11th identification information indicating that a usage restriction of the extension of the LADN service area is not supported, or when the UE does not receive the 11th identification information, the UE may recognize that the network does not support the usage restriction of the extension of the LADN service area. Further, when the UE receives the 11th identification information indicating that a usage restriction of the extension of the LADN service area is not supported, or when the UE does not receive the 11th identification information, the UE may recognize that the use of the extension of the LADN service area is restricted. Besides, when the use of the extension of the LADN service area is restricted, the UE may be prohibited from using an extended LADN service area.

Furthermore, when the UE receives the 12th identification information, the UE may recognize a list of DNNs that can be used for connection to the LADN and/or an LADN service area serving as an area that can be connected to an LADN, or may store them and/or it in the context. Moreover, when the UE receives the 12th identification information, the UE may recognize one or more S-NSSAI that can be used for connection to the LADN, or may store it in the context. Further, the UE may recognize that S-NSSAI that can be used for connection to the LADN is associated with a DNN and/or an LADN service area that can be used for connection to the LADN, and may store the S-NSSAI in the context associated with the DNN and/or the LADN service area.

In other words, when the UE receives the 12th identification information, the UE may recognize a PDU session that can be established for the LADN corresponding to the received LADN DNN, or may recognize a PDU session that can be established for the LADN corresponding to the received LADN S-NSSAI. Further, when the UE receives the 12th identification information, the UE may recognize a PDU session that can be established for the LADN corresponding to a combination of the received LADN DNN and the received LADN S-NSSAI.

Furthermore, in other words, when the UE receives the 12th identification information, the UE may recognize that an LADN service area is an area that can establish a PDU session for LADN corresponding to the LADN DNN, or may recognize that an LADN service area is an area that can establish a PDU session for LADN corresponding to the LADN S-NSSAI. Further, when the UE receives the 12th identification information, the UE may recognize that the received LADN service area is an area that can establish a PDU session for LADN corresponding to the combination of the LADN DNN and the LADN S-NSSAI.

On the contrary, when the UE does not receive the 12th identification information, the UE may recognize that the network does not support the LADN, or may recognize that the connection to the LADN is not allowed. Further, when the UE does not receive the 12th identification information, the UE may recognize that the LADN information stored by the UE is invalid, or may invalidate the LADN information stored by the UE. Furthermore, when the UE does not receive the 12th identification information, the UE may recognize that the LADN information stored by the UE needs to be deleted, or may delete the LADN information stored by the UE.

Moreover, when the UE receives the 12th identification information whose content is null, the UE may recognize that the network does not support the LADN, or may recognize that the connection to the LADN is not allowed. Further, when the UE receives the 12th identification information whose content is null, the UE may recognize that the LADN information stored by the UE is invalid, or may invalidate the LADN information stored by the UE. Furthermore, when the UE receives the 12th identification information whose content is null, the UE may recognize that the LADN information stored by the UE needs to be deleted, or may delete the LADN information stored by the UE.

In these cases, when the UE holds the PDU session for LADN, the UE may locally release the PDU session for LADN. More specifically, in these cases, when the UE holds one or more PDU sessions for the LADN, the UE may also locally release all PDU sessions for the LADN. Furthermore, in these cases, when the UE holds the PDU session for LADN, the PDU session for LADN may also be released. More specifically, in these cases, when the UE holds one or more PDU sessions for the LADN, all PDU sessions for the LADN may also be released.

Further, in these cases, when the UE holds the PDU session for LADN, the UE may release the PDU session for LADN through a PDU session release procedure requested by the network. Furthermore, in these cases, when the UE holds the PDU session for LADN, the UE may release the PDU session for LADN through a PDU session release procedure requested by the UE. Moreover, in these cases, when the UE holds the PDU session for LADN, the UE may initiate a UE-requested PDU session release procedure in order to release the PDU session for LADN.

Besides, in these cases, when the UE holds a PDU session corresponding to old LADN information, the UE may locally release the PDU session. Further, in these cases, when the UE holds one or more PDU sessions corresponding to old LADN information, the UE may locally release all PDU sessions corresponding to the old LADN information.

Furthermore, when the AMF does not include the 12th identification information in the registration accept message during the registration procedure for mobility and registration update, the UE may delete the old LADN information. Here, when the UE holds the PDU session for LADN, the UE may locally release the PDU session for LADN.

More specifically, when the AMF does not include the 12th identification information in the registration accept message during the registration procedure for mobility and registration update, the UE may also delete the old LADN information. Here, when the UE holds one or more PDU sessions for the LADN, the UE may locally release all PDU session for LADN.

Furthermore, when the AMF does not include the 12th identification information in the registration accept message during the registration procedure for mobility and registration update, the UE may delete the old LADN information. Here, when the UE holds the PDU session for LADN, the PDU session for LADN may be released.

More specifically, when the AMF does not include the 12th identification information in the registration accept message during the registration procedure for mobility and registration update, the UE may also delete the old LADN information. Here, when the UE holds one or more PDU sessions for the LADN, all PDU session for LADN may be released.

Furthermore, when the AMF does not include the 12th identification information in the registration accept message during the registration procedure for mobility and registration update, the UE may delete the old LADN information. Here, when the UE holds the PDU session for LADN, the UE may release the PDU session for LADN through a PDU session release procedure requested by the network.

Furthermore, when the AMF does not include the 12th identification information in the registration accept message during the registration procedure for mobility and registration update, the UE may delete the old LADN information. Moreover, when the UE holds the PDU session for LADN, the UE may release the PDU session for LADN through a PDU session release procedure requested by the UE.

Furthermore, when the AMF does not include the 12th identification information in the registration accept message during the registration procedure for mobility and registration update, the UE may delete the old LADN information. Here, when the UE holds the PDU session for LADN, the UE may initiate a UE-requested PDU session release procedure in order to release the PDU session for LADN.

Furthermore, when the AMF does not include the 12th identification information in the registration accept message during the registration procedure for mobility and registration update, the UE may delete the old LADN information. Here, when the UE holds a PDU session corresponding to old LADN information, the UE may locally release the PDU session.

Furthermore, when the AMF does not include the 12th identification information in the registration accept message during the registration procedure for mobility and registration update, the UE may delete the old LADN information. Here, when the UE holds one or more PDU sessions corresponding to old LADN information, the UE may locally release all PDU sessions corresponding to the old LADN information.

Here, the released PDU session for LADN may also be a PDU session corresponding to the old LADN information. In other words, the released PDU session for LADN may also be a PDU session corresponding to the deleted LADN information.

Further, the PDU session release procedure requested by the network may also be a procedure initiated by the SMF transmitting a PDU session release command message to the UE. During the PDU session release procedure requested by the network, the UE may release the PDU session based on the reception of the PDU session release command message from the SMF and/or the completion of the PDU session release procedure requested by the network.

Further, the PDU session release procedure requested by the UE may also be a procedure initiated by the UE transmitting a PDU session release request message to the SMF. During the PDU session release procedure requested by the UE, the UE may receive the PDU session release command message from the SMF as a response message in response to the PDU session release request procedure, or may release the PDU session based on the reception of the PDU session release command message from the SMF and/or the completion of the PDU session release procedure requested by the UE.

Besides, each apparatus holding a PDU session may indicate that each apparatus has established a PDU session. Specifically, a UE holding a PDU session may indicate that a UE has established a PDU session. Further, an AMF holding a PDU session may indicate that an AMF has established a PDU session. Furthermore, an SMF holding a PDU session may indicate that an SMF has established a PDU session.

Moreover, when the UE receives the 13th identification information, the UE may recognize the granularity of the LADN service area. More specifically, when the UE receives the 13th identification information together with the 12th identification information, the UE may recognize the granularity of the LADN service area indicated by the LADN service area information included in the 12th identification information, or may store the granularity in the context associated with the LADN service area information. Specifically, when the UE receives the 13th identification information together with the 12th identification information, the UE may recognize that the LADN service area indicated by the LADN service area information is an area including one or more tracking areas as the granularity of the LADN service area, or may recognize that the LADN service area is an area that is different from an area including one or more tracking areas. Further, when the UE receives the 13th identification information together with the 12th identification information, the UE may recognize that the tracking area ID list is included as the LADN service area information, may recognize that the information requiring the assistance of the RAN is included as the LADN service area information, or may recognize that the information not requiring the assistance of the RAN is included as the LADN service area information.

On the contrary, when the UE does not receive the 13th identification information, the UE may use default granularity as the granularity of the LADN service area. Further, when the UE has received the 13th identification information but the 13th identification information is invalid information, and/or when the UE does not support the extension of the LADN service area, the UE may ignore the received 13th identification information, or may use default granularity as the granularity of the LADN service area. Here, the default granularity may be granularity set in advance for the UE, or may also be granularity indicated by information previously received from the network. Further, in the case of the default granularity, the LADN service area may be an area including one or more tracking areas, and the LADN service area information may be a tracking area ID list.

Besides, when the 12th identification information includes a plurality of pieces of information indicating LADN, the UE may store, for each piece of information indicating LADN, the granularity of the LADN service area in the context associated with the information indicating LADN. Further, when the 12th identification information includes a plurality of pieces of LADN service area information, the UE may store, for each piece of LADN service area information, the granularity of the LADN service area in the context associated with the LADN service area information.

Furthermore, when the UE receives the 14th identification information, the UE may recognize the period during which the LADN service area is valid. More specifically, when the UE receives the 14th identification information together with the 12th identification information, the UE may recognize the period during which the LADN service area indicated by the LADN service area information included in the 12th identification information is valid, or may store the granularity in the context associated with the LADN service area information.

On the contrary, when the UE does not receive the 14th identification information, the UE may use a default period as the period during which the LADN service area is valid. Further, when the UE has received the 14th identification information but the 14th identification information is invalid information, and/or when the UE does not support the extension of the LADN service area, the UE may ignore the received 14th identification information, or may use a default period as the period during which the LADN service area is valid. Here, the default period may be a period set in advance for the UE, or may also be a period indicated by information previously received from the network. Further, the default period may also be a period ended until the LADN information is updated.

Besides, when the 12th identification information includes a plurality of pieces of information indicating LADN, the UE may store, for each piece of information indicating LADN, the period, during which the LADN service area is valid, in the context associated with the information indicating LADN. Further, when the 12th identification information includes a plurality of pieces of LADN service area information, the UE may store, for each piece of LADN service area information, the period, during which the LADN service area is valid, in the context associated with the LADN service area information.

Furthermore, when the UE receives the 11th identification information, and/or the 13th identification information, and/or 14th identification information together with the 12th identification information, the UE may recognize that extended LADN information and/or an extended LADN service area can be used, or may store LADN information and/or LADN service area information, which can be used, in the context. Moreover, the UE may recognize that the received LADN information is extended LADN information, or may store in the context the received LADN information as extended LADN information. Further, the UE may recognize that the LADN service area indicated by the received LADN service area information may be an extended LADN service area, or may store in the context the received LADN service area information as LADN service area information indicating the extended LADN service area. Here, the 11th identification information may be information indicating that the extension of the LADN service area is supported, and the 12th identification information may be extended LADN information.

On the contrary, when the UE receives the 11th identification information and/or the 12th identification information but does not receive the 13th identification information and/or the 14th identification information, and/or when the UE receives the 12th identification information but does not receive the 11th identification information, and/or the 13th identification information, and/or the 14th identification information, the UE may recognize that the extended LADN information and/or the extended LADN service area cannot be used. Furthermore, the UE may recognize that the conventional LADN information and/or the conventional LADN service area can be used, or may store in the context the LADN information and/or the LADN service area information that can be used. Moreover, the UE may recognize that the received LADN information is conventional LADN information, or may store in the context the received LADN information as the conventional LADN information. Further, the UE may recognize that the LADN service area indicated by the received LADN service area information may be a conventional LADN service area, or may store in the context the received LADN service area information as LADN service area information indicating the conventional LADN service area. Here, the 11th identification information may be information indicating that the extension of the LADN service area is not supported, and the 12th identification information may be conventional LADN information.

Further, when the UE receives the 12th identification information in a state where the UE does not support the extension of the LADN service area, the UE may recognize that extended LADN information and/or an extended LADN service area cannot be used. Furthermore, the UE may recognize that the conventional LADN information and/or the conventional LADN service area can be used, or may store in the context the LADN information and/or the LADN service area information that can be used. Moreover, the UE may recognize that the received LADN information is conventional LADN information, or may store in the context the received LADN information as the conventional LADN information. Further, the UE may recognize that the LADN service area indicated by the received LADN service area information may be a conventional LADN service area, or may store in the context the received LADN service area information as LADN service area information indicating the conventional LADN service area. Here, the 12th identification information may be conventional LADN information.

Further, when the UE receives at least the 12th identification information and is located in the LADN service area indicated by the received information, the UE may recognize that a PDU session for LADN can be established, or may initiate a PDU session establishment procedure for establishing a PDU session for LADN. In other words, when the UE receives at least the 12th identification information and is located outside the LADN service area indicated by the received information, the UE may recognize that a PDU session for LADN cannot be established, or may prohibit a PDU session establishment procedure for establishing a PDU session for LADN.

Further, the UE may initiate a PDU session establishment procedure for establishing a PDU session for LADN based on the update of the LADN information and/or the determination of whether the UE is located in the LADN service area. Specifically, the UE may initiate a PDU session establishment procedure for establishing a PDU session for LADN based on a determination that the UE is located in the LADN service area. On the contrary, each apparatus may release a PDU session for LADN base on a determination that the UE is outside the LADN service area, or may also release a user plane resource associated with the PDU session for LADN.

Here, the determination of whether the UE is located in the LADN service area may be performed based on the extended LADN service area, or may also be performed based on the conventional LADN service area. In other words, when each apparatus stores the extended LADN service area, each apparatus may also perform the determination of whether the UE is located in the LADN service area based on the extended LADN service area. On the contrary, when each apparatus stores the conventional LADN service area, each apparatus may also perform the determination of whether the UE is located in the LADN service area based on the conventional LADN service area.

Further, when the stored LADN service area is a tracking area ID list, each apparatus may determine whether the UE is located in the LADN service area based on the comparison between the LADN service area information stored by the UE and the tracking area ID acquired from the RAN. Specifically, when the tracking area ID acquired by the UE from the RAN is included in the LADN service area information stored by the UE, the UE may recognize and store that the UE is located in the LADN service area. On the contrary, when the tracking area ID acquired by the UE from the RAN is not included in the LADN service area information stored by the UE, the UE may recognize and store that the UE is located outside the LADN service area.

Further, when the stored LADN service area is information that requires the assistance of the RAN, each apparatus may determine whether the UE is located in the LADN service area based on the comparison between the LADN service area information stored by the UE and the information acquired from the RAN. Specifically, when the information acquired by the UE from the RAN is included in the LADN service area information stored by the UE, the UE may recognize and store that the UE is located in the LADN service area. On the contrary, when the information acquired by the UE from the RAN is not included in the LADN service area information stored by the UE, the UE may recognize and store that the UE is located outside the LADN service area.

Further, when the stored LADN service area is information that does not require the assistance of the RAN, each apparatus may determine whether the UE is located in the LADN service area based on the comparison between the LADN service area information stored by the UE and the information acquired from the other than the RAN. Specifically, when the information acquired by the UE from the other than the RAN is included in the LADN service area information stored by the UE, the UE may recognize and store that the UE is located in the LADN service area. On the contrary, when the information acquired by the UE from the other than the RAN is not included in the LADN service area information stored by the UE, the UE may recognize and store that the UE is located outside the LADN service area.

In addition, the determination of whether the UE is located in the LADN service area may also be performed based on transmission and reception of a control message transmitted from the network to the UE. Specifically, the UE may, based on the control message received from the network, recognize and store that the UE is located in the LADN service area. On the contrary, the UE may, based on the control message received from the network, recognize and store that the UE is located outside the LADN service area. Here, the control message transmitted from the network to the UE may be, for example, a control message for location services (LCS). Besides, the determination of whether the UE is located in the LADN service area may not be limited to the above.

Further, the UE may, within a period during which the LADN service area is valid, recognize that a PDU session for LADN can be established, or initiate a PDU session establishment procedure for establishing a PDU session for LADN. In other words, the UE may, outside a period during which the LADN service area is valid, recognize that a PDU session for LADN cannot be established, or prohibit a PDU session establishment procedure for establishing a PDU session for LADN.

Further, the UE may initiate a PDU session establishment procedure for establishing a PDU session for LADN based on the update of the LADN information and/or the determination of the activation of the LADN service area. Specifically, the UE may initiate a PDU session establishment procedure for establishing a PDU session for LADN based on the determination of the activation of the LADN service area. On the contrary, each apparatus may, based on the invalidation of the LADN service area, release a PDU session for LADN established associated with an invalidated LADN service area, or release a user plane resources associated with the PDU session for the LADN.

Here, the determination of the activation of the LADN service area may be performed based on the information indicating the period during which the LADN service area is valid. Specifically, the UE may compare the valid period of the LADN service area with the current time, and determine that the LADN service area is valid under a condition where the current time is within the valid period of the LADN service area. On the contrary, the UE may compare the valid period of the LADN service area with the current time, and determine that the LADN service area is invalid under a condition where the current time is outside the valid period of the LADN service area. Further, the UE may activate an associated LADN service area based on the start of a period during which the LADN service area indicated by the received information is valid. On the contrary, the UE may invalidate an associated LADN service area based on the end of a period during which the LADN service area indicated by the received information is valid.

In addition, the determination of the activation of the LADN service area may also be performed based on a control message received from the network. Specifically, when the UE receives the control message from the network, the UE may also determine that the LADN service area is valid. Further, when the UE cannot receive the control message from the network, the UE may also determine that the LADN service area is not valid. On the contrary, when the UE receives the control message from the network, the UE may also determine that the LADN service area is not valid. Further, when the UE cannot receive the control message from the network, the UE may also determine that the LADN service area is valid. Furthermore, the UE may activate the LADN service area based on a control message received from the network. On the contrary, the UE may invalidate the LADN service area based on a control message received from the network. In addition, the determination of the activation of the LADN service area may not be limited to the above.

[3.2.2. PDU Session Establishment Procedure]

Next, an overview of the PDU session establishment procedure will be described below. The PDU session establishment procedure is performed to establish a PDU session for DN. The PDU session establishment procedure is a procedure in 5GS. In addition, each apparatus can initiate the PDU session establishment procedure at any timing when a registration procedure is completed and becomes a registered state. In addition, each apparatus may perform a PDU session establishment procedure during the registration procedure. In addition, each apparatus may establish a PDU session based on the completion of a PDU session establishment procedure. In addition, the PDU session establishment procedure may be a procedure initiated by the UE, or may also be a procedure initiated by the UE request. Each apparatus may establish a plurality of PDU sessions by performing a plurality of PDU session establishment procedures. Hereinafter, each step of the PDU session establishment process will be briefly described.

First, the UE transmits a PDU session establishment request message to the SMF via the AMF, thereby initiating a PDU session establishment procedure. Further, the UE receives a PDU session establishment accept message from the SMF via the AMF. Further, the UE may transmit a PDU session establishment complete message based on the reception of the PDU session establishment accept message. Further, the UE may complete the PDU session establishment procedure by receiving the PDU session establishment accept message and/or sending the PDU session establishment complete message. Further, each apparatus may establish a PDU session based on the completion of the PDU session establishment process. Here, the PDU session establishment accept message may also be a response message in response to the PDU session establishment request message. Further, the PDU session establishment complete message may be a response message in response to the PDU session establishment accept message.

Here, when the PDU session establishment procedure is a PDU session establishment procedure for establishing a PDU session for LADN, the UE may transmit the PDU session establishment request message, including DNN (i.e., LADN DNN) that can be used for connection to the LADN. Further, when the PDU session establishment procedure is a PDU session establishment procedure for establishing a PDU session for LADN, the UE may transmit the PDU session establishment request message, including S-NSSAI (i.e., LADN S-NSSAI) that can be used for connection to the LADN, or may transmit the PDU session establishment request message, including S-NSSAI associated with LADN DNN.

In these cases, the UE may select the LADN DNN included in the PDU session establishment request message from the LADN DNN included in the LADN information received before performing a PDU session establishment procedure, or may select the LADN DNN included in the PDU session establishment request message from the LADN DNN stored by the UE. Further, the UE may select the LADN S-NSSAI included in the PDU session establishment request message from the LADN S-NSSAI included in the LADN information received before performing a PDU session establishment procedure, or may select the LADN S-NSSAI included in the PDU session establishment request message from the LADN S-NSSAI stored by the UE. Furthermore, the UE may select the S-NSSAI associated with the LADN DNN included in the PDU session establishment request message, and have the selected S-NSSAI be included in the PDU session establishment request message.

Moreover, when a plurality of LADN DNN are included in the LADN information received before performing the PDU session establishment procedure, and/or when a plurality of LADN DNNs are stored, the UE may select the LADN DNN based on the LADN service area information and/or the information indicating the period during which the LADN service area is valid, and may have the selected LADN DNN be included in the PDU session establishment request message and transmitted. Furthermore, when a plurality of LADN S-NSSAI are included in the LADN information received before performing the PDU session establishment procedure, and/or when a plurality of pieces of LADN S-NSSAI are stored, the UE may select the LADN S-NSSAI based on the LADN service area information and/or the information indicating the period during which the LADN service area is valid, and may have the selected LADN S-NSSAI be included in the PDU session establishment request message and transmitted. More specifically, when a plurality of pieces of information indicating LADN are included in the LADN information received before performing the PDU session establishment procedure, and/or when a plurality of pieces of information indicating LADN are stored, the UE may select the information indicating LADN based on the LADN service area information and/or the information indicating the period during which the LADN service area is valid, and may have the LADN DNN, and/or LADN S-NSSAI included in the selected information indicating LADN, be included in the PDU session establishment request message and transmitted. Further, when the PDU session establishment procedure is a PDU session establishment procedure for establishing a PDU session for LADN, each apparatus may establish a PDU session for LADN based on the completion of the PDU session establishment procedure.

4. First Embodiment

Next, the first embodiment will be described. Hereinafter, the first embodiment will be referred to as the present embodiment. In a communication procedure of the present embodiment, each apparatus first performs a registration procedure initiated by the UE. Next, each apparatus establishes a PDU session by performing a PDU session establishment procedure initiated by the UE, and transitions to a state in which communication can be performed between the UE and the DN using the PDU session. Next, each apparatus transmits and receives user data using the PDU session. With the above operations, the procedure of the present embodiment is completed.

In addition, in the procedure of the present embodiment, each apparatus may exchange support information for the extension of the LADN service area and/or LADN information between the UE and the network in the registration procedure.

Further, during the PDU session establishment process, each apparatus may establish a PDU session for LADN between the UE and the network based on the information exchanged in the registration procedure. In addition, the PDU session for LADN may also be a PDU session that can be established only if the UE is located in a specific area. Here, the specific area may be, for example, an LADN service area.

Further, each apparatus may perform communication of user data with the LADN by using the established PDU session. Furthermore, each apparatus may release the established PDU session or may release the user plane resources associated with the established PDU session based on the update of the LADN information and/or the change of the state of the LADN service area.

5. Modified Example

A program running on an apparatus according to the present invention may serve as a program that controls a central processing unit (CPU) and the like to cause a computer to operate in such a manner as to implement the functions of the above-described embodiment according to the present invention. Programs or information handled by the programs are temporarily stored in a volatile memory such as a random access memory (RAM), a non-volatile memory such as a flash memory, a hard disk drive (HDD), or other storage device system.

Besides, a program for implementing such functions of the embodiment according to the present invention may be recorded on a computer-readable recording medium. The functions may be implemented by causing a computer system to read the program recorded on the recording medium for execution. The "computer system" described herein refers to a computer system built into the apparatuses, and includes an operating system and hardware components such as peripheral devices. In addition, the "computer-readable recording medium" may be any of a semiconductor recording medium, an optical recording medium, a magnetic recording medium, a medium dynamically retaining the program for a short time, or any other computer readable recording medium.

In addition, the various functional blocks or various features of the devices used in the described embodiments may be installed or performed by an electrical circuit, such as an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. In addition, in a case that with advances in semiconductor technology, a circuit integration technology appears that replaces the present integrated circuits, one or more aspects of the present invention are also possible to use a new integrated circuit based on the technology.

Besides, the present invention is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes design modification that falls within the scope and does not depart from the gist of the present invention. In addition, various modifications are possible within the scope of the present invention defined by claims, and embodiments that are made by suitably combining technical means disclosed according to the different embodiments are also included in the technical scope of the present invention. In addition, a configuration, in which constituent elements described in the respective embodiments and having mutually the same effects are substituted for one another, is also included in the technical scope of the present invention.

What is claimed is:

1. A user equipment (UE), comprising:
   a storage unit configured to store local area data network (LADN) information;
   a transceiving unit configured to receive a registration accept message from an access and mobility management function (AMF) in a registration procedure for mobility and registration update; and
   a control unit, wherein:
   when the AMF does not include the LADN information in the registration accept message in the registration procedure, the control unit is configured to:
   delete the stored LADN information,
   recognize that the UE is located outside an LADN service area of an LADN, and
   initiate a UE-requested protocol data unit (PDU) session release procedure to request a network to release a PDU session for the LADN.

2. A communication control method for a user equipment (UE), the communication control method comprising:
   storing local area data network (LADN) information; and
   receiving a registration accept message from an access and mobility management function (AMF) in a registration procedure for mobility and registration update, wherein:
   when the AMF does not include the LADN information in the registration accept message in the registration procedure, the communication control method further comprises:
   deleting the stored LADN information,
   recognizing that the UE is located outside an LADN service area of an LADN, and
   initiate a UE-requested protocol data unit (PDU) session release procedure to request a network to release a PDU session for the LADN.

* * * * *